United States Patent [19]
Bates et al.

[11] Patent Number: 5,339,388
[45] Date of Patent: Aug. 16, 1994

[54] CURSOR LOCK REGION

[75] Inventors: Cary L. Bates, Rochester; Jeffrey M. Ryan, Byron, both of Minn.

[73] Assignee: International Business Machines Corporation, Armonk, N.Y.

[21] Appl. No.: 816,451

[22] Filed: Dec. 31, 1991

[51] Int. Cl.⁵ .......................................... G06F 15/62
[52] U.S. Cl. ................................. 395/153; 395/148; 395/161
[58] Field of Search ............... 395/100, 148, 155, 156, 395/157, 153, 159, 161

[56] References Cited

U.S. PATENT DOCUMENTS

| | | | |
|---|---|---|---|
| 4,558,413 | 12/1985 | Schmidt et al. | 364/200 |
| 4,635,189 | 1/1987 | Kendall | 364/200 |
| 4,651,299 | 3/1987 | Miyazaki et al. | 364/900 |
| 4,654,483 | 3/1987 | Imai et al. | 379/54 |
| 4,698,752 | 10/1987 | Goldstein et al. | 364/200 |
| 4,752,773 | 6/1988 | Togawa | 340/721 |
| 4,802,104 | 1/1989 | Ogiso | 395/157 |
| 4,853,843 | 8/1989 | Ecklund | 364/200 |
| 4,890,098 | 12/1989 | Dawes et al. | 395/157 |
| 4,890,257 | 12/1989 | Anthias et al. | 395/157 |
| 4,958,301 | 9/1990 | Kobayashi | 364/521 |
| 4,974,173 | 11/1990 | Stefik et al. | 395/155 |
| 5,001,628 | 3/1991 | Johnson et al. | 364/200 |
| 5,008,853 | 4/1991 | Bly et al. | 364/900 |

OTHER PUBLICATIONS

C. A. Ellis et al., "Group Wear," *Communications of the ACM*, vol. 34, No. 1, Jan., 1991, pp. 38-58.
G. Foster, "Collaborative Systems and Multiuser Interface," doctoral dissertation, Oct. 31, 1986.
Stefik et al., "Beyond the Chalk Board: Computer Support for Collaboration and Problem Solving in Meetings," *Communications of the ACM*, vol. 30, No. 1, Jan. 1987.
I. Greif et al., "Data Sharing in Group Work," *Conference on Computer Supported Cooperative Work of 1986*.
Sarin et al., "Computer Based Real-time Conferencing Systems," *Computer Journal of IEEE*, Oct., 1985.
Stefik et al., "WYSIWIS Revised: Early Experiences with Multiuser Interfaces," *ACM*, 1987, p. 153.
Harold S. Stone, High Performance Computer Architecture, Addison-Wesley Publishing Company, 1987, Chapter 7, "Synchronization Techniques Multiprocessor Algorithms," pp. 347-352.
"Design and Implementation of Gordion, an Object Based Management System" reported in the Proceedings of Third International Conference on Data Engineering, 1987, IEEE, Washington, D.C., United States, pp. 226-234.
Copy of European Search Report of Jul. 2, 1993.

*Primary Examiner*—Heather R. Herndon
*Attorney, Agent, or Firm*—Steven Roth; Andrew J. Dillon

[57] ABSTRACT

The invention provides for protecting floating blocks of text or other portions of a shared data object in collaborative computer based system from simultaneous manipulation originating with two or more users. The collaborative computer based system includes a network connecting a plurality of terminals for communication. Each terminal includes an output display device and a user input device. A shared data object simultaneously accessible by a plurality of users of the system. Responsive to a user obtaining access to the shared data object, the user is assigned a cursor available for display on the visual display devices of all current users. Responsive to movement by a user of his or her cursor, an attempt is made to establish a lock region in the shared data object by determining position coordinates. If the position coordinates do not include any portion of any previously established lock region, a lock region associated with the user's cursor may be established. Movement of a cursor operates to release any prior lock region associated with the cursor if a new lock is established or if the cursor leaves the old lock.

14 Claims, 26 Drawing Sheets

TARGET OBJECT EDITOR

§ 103. Conditions for patentability; non-obvious subject matter

A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made.

Fig. 3

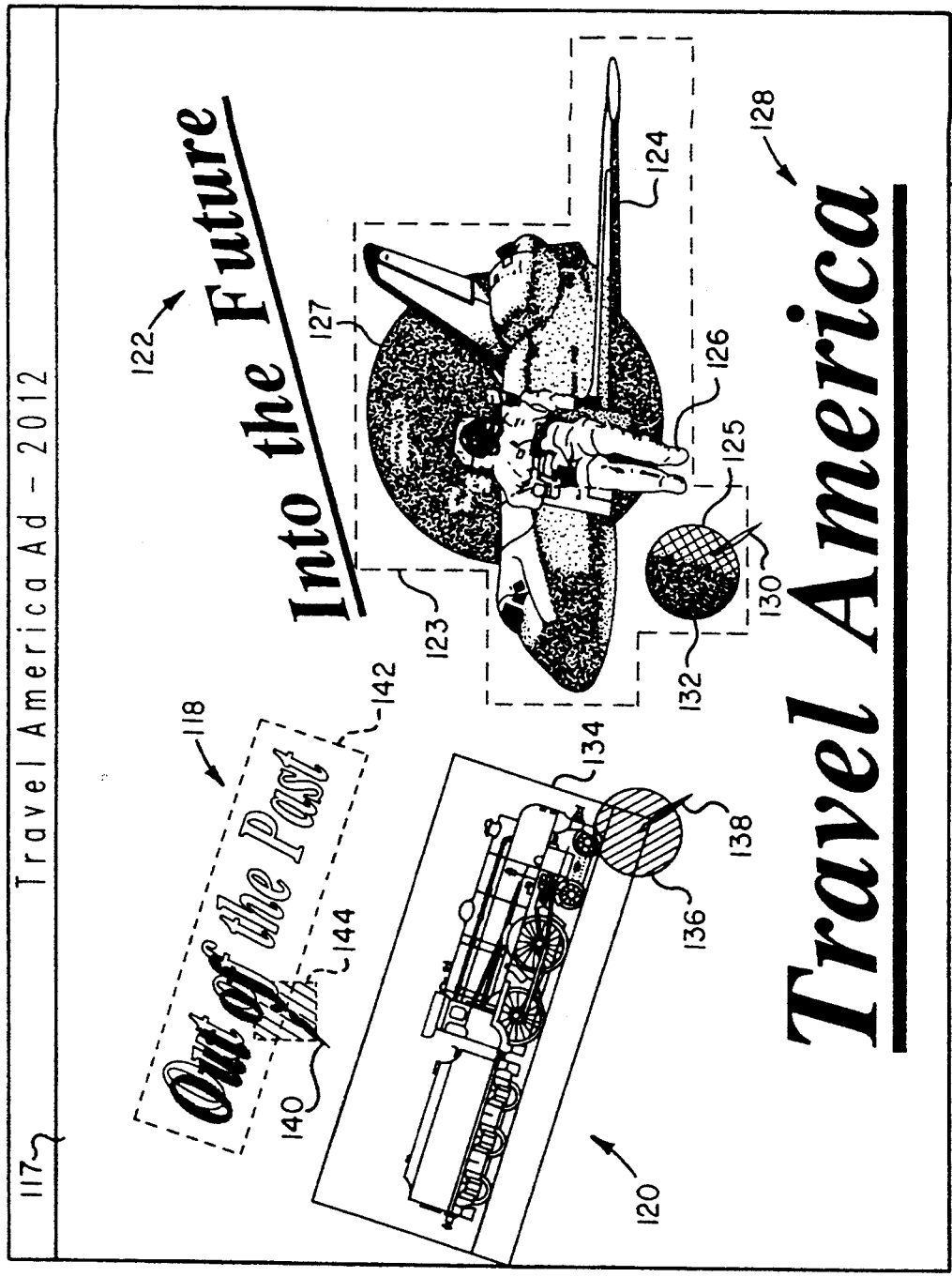

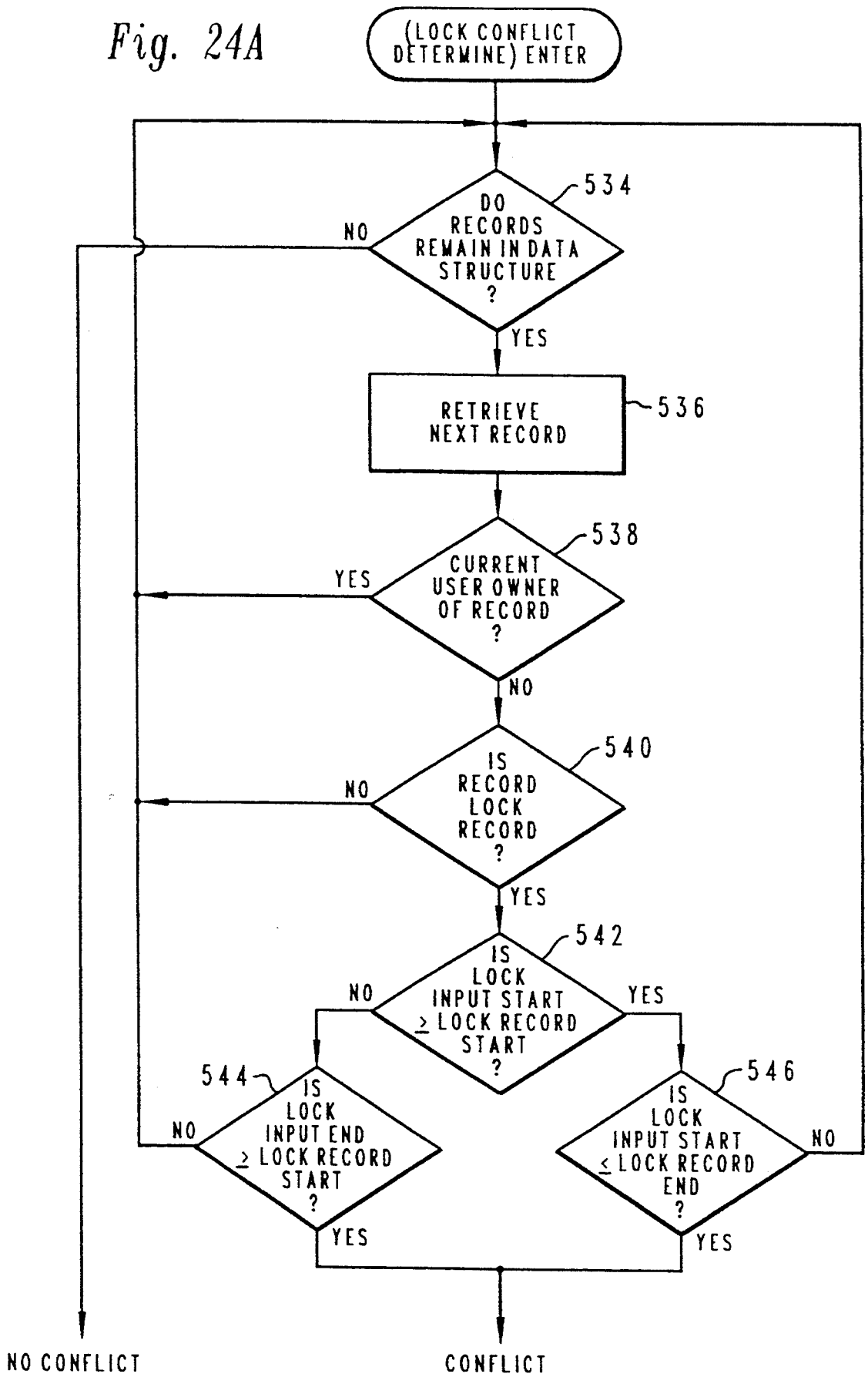

CURSOR LOCK REGION

CROSS-REFERENCE TO RELATED APPLICATIONS

The present application contains subject matters related to co-pending U.S. patent application Ser. No. 07/816,623, entitled *Method and System for Identifying Users in a Collaborative Computer-Based System*, and U.S. patent application Ser. No. 07/816,459, entitled *User Selectable Lock Regions*, filed on even date herewith and assigned to the assignee hereof and incorporated by reference herein.

BACKGROUND OF THE INVENTION

1. Technical Field

The field of the invention relates to collaborative computer based system and more particularly to a modified What You See Is What I See multiuser interface for a collaborative editor. Still more particularly the invention relates to a method of protecting floating blocks of text or other portions of a shared data object associated with editing cursor in collaborative computer based system from simultaneous manipulation originating with two or more users.

2. Description of the Related Art

A collaborative system may be defined as a real-time computer based environment coordinating individual efforts toward completion of a task. The task or subject of a group's attention may be a document, a production schedule, a computer program, a product design, or any other task, solution of which is represented by the organized expression of information. Construction of that expression is presumed aided by the efforts of more than one person and particularly by the simultaneous efforts of more than one person.

A computer network is typically the vehicle for coordinating work. The subject of the work is typically structured as one or more shared data objects stored in memory accessible over the network. The machine for constructing the data object is software, such as a text editor or data base management facilities. The user accesses the shared data object through multiuser interface facilities supported by the network.

A shared data object is one which is simultaneously accessible to a plurality of users over the network. Such data objects can include, for example, word processing documents and spread sheets. A shared data object is a data object to which more than one user at a time is permitted some type of access.

Thus, a common issue facing designers of collaborative systems is the type of concurrent access permitted each of a plurality of users. This core issue has a number of subsidiary issues. User access can be limited to the ability to read an object, but more commonly includes some rights to manipulate or change the object. For example: Who among the users is permitted rights to change the data object? Shall each user be shown the same representation of the data object? How free are users to be in changing their viewpoint of the shared data object?

A user has access to a shared data object through a multiuser interface. The interface typically includes a video monitor under the control of the user's local workstation, through which views of the shared data object are displayed. The interface is supported by software allowing multiple simultaneous access to an object with the right to manipulate the contents of the object.

The general characteristics of one category of common multiuser interface are referred to as the What You See Is What I See (WYSIWIS) concept. In strict form, each user sees exactly the same thing, from the same viewpoint, with each user being given apparent immediate rights to manipulate the shared object. All user cursors are simultaneously displayed. Updates are transmitted to each participant, allowing the participants to see what is being done as it is done. In practice the WYSIWIS concept is partially relaxed. For example, users are typically permitted to select their point of view. User selected points of view are known as private views of public objects. In a word processing document a user selects the portion of the document of current interest to that user as a private view.

While the WYSIWIS concept has been relaxed for convenience sake, it has also been relaxed as a concession to limits in the technology. Consider the example of collaborative work on the text of a word processing document. Each user having current access to the document has a window generated on the video monitor of his or her local workstation, with text taken from the document reproduced in the window. Each user will have one text cursor, indicating the point in the document where the user may make changes. In strict WYSIWIS, all text cursors are to be displayed. In practice, the inability to distinguish ownership of a cursor on sight has proven confusing, sometimes requiring suppression of private cursors, except the user's own, from a user's video monitor.

Conflicts or collisions in user actions, such as simultaneous attempts to change the same word in a word processing document, can also cause problems. In strict WYSIWIS, conflicts are allowed to occur. Each user is given an impression of immediate accessibility. In a setting where the workstations are all in one room, or a form of teleconferencing is occurring, permitting such collisions is tolerable because the participants can settle the dispute by conversation. Collisions are less tolerable where the usual communication between users is that which is implied by changes in the shared document.

SUMMARY OF THE INVENTION

Thus it is an object of the invention to provide a method of enhancing cooperative work in a collaborative computer system.

It is another object the invention to provide a collaborative editing system for shared data objects.

It is yet another object of the invention to provide a modified What You See Is What I See (WYSIWIS) interface.

It is still another object of the invention to provide a method of resolving conflicts between cursors in a collaborative editing system.

It is another object of the invention to provide a method of protecting floating blocks associated with a cursor in a shared data object from simultaneous manipulation originating with two or more users.

The foregoing objects are achieved as is now described. The method of the present invention may be utilized for protecting floating blocks in text, graphics or pictures of a shared data object from simultaneous manipulation originating with two or more users. The collaborative computer based system includes a network connecting a plurality of terminals for communication. Each terminal includes an output display device and a user input device. The collaborative computer based system includes a shared data object simultaneously accessible by a plurality of users of the system. Responsive to a user obtaining access to the shared data object, the user is assigned a cursor available for display on the visual display devices of all current users. Responsive to movement by a user of his or her cursor, an attempt is made to establish a lock region associated with the cursor in the shared data object. If the location for the lock does not lie in any previously established lock region, a lock region related to the position for the cursor may be established. Establishment of a new lock or movement of a cursor outside of an old lock releases any prior lock region associated with the cursor. Thus a plurality of transitory, floating lock regions is established, each following the position of one cursor and occurring whenever an area is reached by that cursor having no current lock region and meeting any other selective qualifying criteria required by a user.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a pictorial view of a window opened to a target textual object for editing;

FIG. 4-7 are pictorial views of a window opened to a target graphical object as the window is edited;

FIGS. 24A and 24B are flow charts relating to first and second embodiments of the invention providing for detection of lock conflict determinations made upon attempts to select a region.

DETAILED DESCRIPTION OF THE INVENTION

Figure 1:
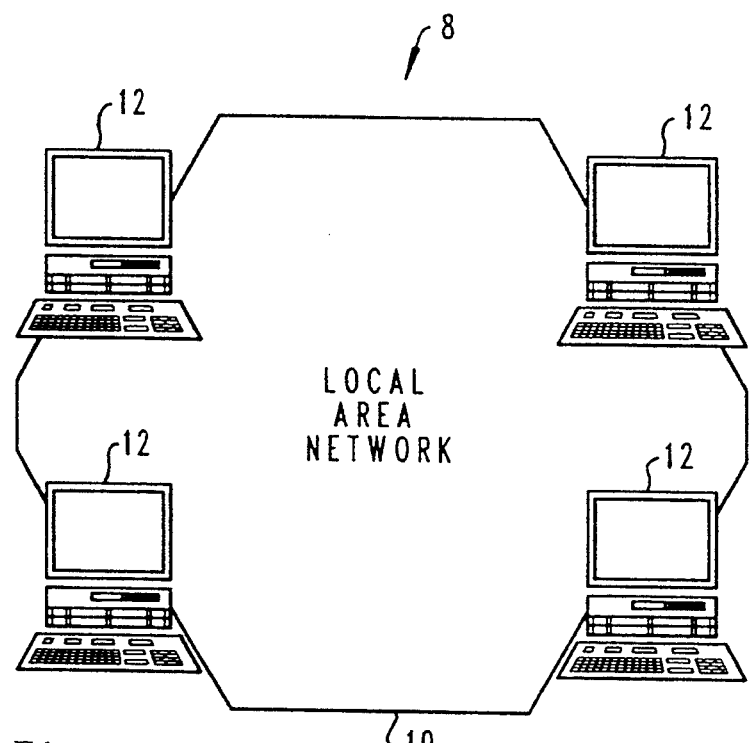
FIG. 1 is a pictorial view of a local area network with which the invention is advantageously employed.

With reference now to the figures and in particular with reference to FIG. 1, there is depicted a pictorial representation of a local area network which may be utilized in accordance with the method of the present invention. Local area network 8 supports a collaborative computer based editing system relating to a data object stored on a server. Local area network 8 provides data communication over a transmission channel 10 between a plurality of personal computers 12. Computers 12 within the depicted system are preferably provided by utilizing an IBM personal computer, an IBM Personal System/2 or other similar system. As those skilled in this art will appreciate, computers 12 generally include a keyboard for receiving user inputs in a video display device to send messages to the user of the local area network. One of computers 12 operates as a server for the network 8. The server may, for example, be a larger computer such as the IBM Application System/400.

Figure 2:
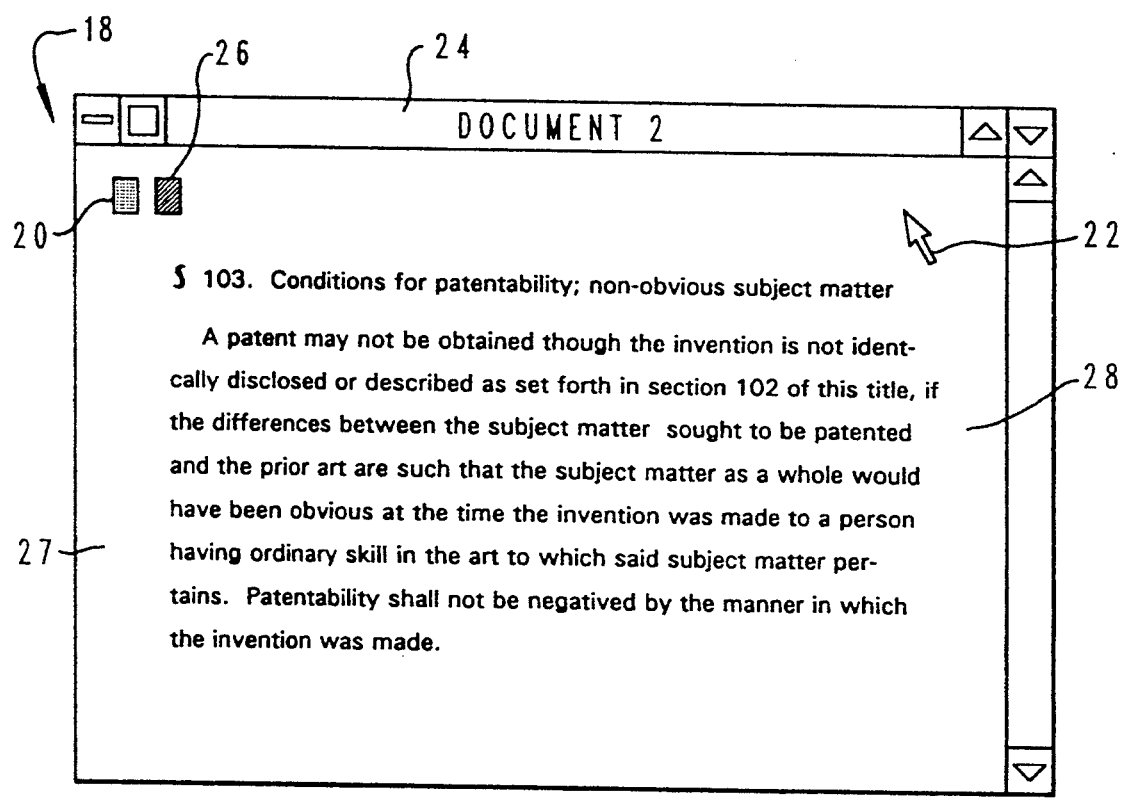
FIG. 2 is a pictorial view of a window generated by computer graphics system to support the user interface of the invention.

FIG. 2 depicts a pictorial representation of a window including examples of features of a multiuser interface supported by the present invention. Window 18 is a conventional window as would appear on a display screen on a computer 12. A locally generated mouse pointer 22 is available for operating control features of the window. Window 18 includes a title bar 24 identifying the shared data object accessed by the user. Display field 27 exhibits a private view 28 of a shared data object. Cursors 20 and 26 also appear in display field 27. Cursor 20 is a cursor assigned the user of private view 27. Cursor 26 is a cursor assigned another user who has access to the same shared data object and who, at least in part, is accessing a portion of the shared data object extending into private view 28. Cursor 20 responds positionally to movement commands generated by the user. Cursor 26 will move about the screen and possibly out of the display field 27 depending on commands from a remote site. Shared data object may be a word processing document represented in portion by lines of text reproduced in display field 27, but could also be a graphical image or other type of document.

Cursors 20 and 26 have display attributes resulting in visually distinct appearances, indicated by the solid shading of cursor 20 and the cross-hatching of cursor 26. In the preferred embodiment, the cursors appear in distinguishing colors.

FIG. 3 is a pictorial view of a window 102 generated on a user display device. A text editor function is associated with window 102. Within a display field 104 is a private view of a target textual object. A user may edit the target textual object by positioning his or her assigned cursor 108 at the point at which the user wishes to make a change or to add material. Cursor 108 appears embedded in a floating, transitory lock region 106, which extends to the word or word equivalent object in which the cursor is currently located. Cursor 108 and lock region 106 appear as colored areas on a color monitor, with the particular colors of the cursor and lock region and the background appearance of the lock region indicating the owner of the cursor and the lock region, as well as the type of lock region.

A region 110 is marked by coloring unique to a particular user to indicate some association with that user. Region 110 may identify ownership, or it may be locked against editing by other users. The second user cursor 114 appears in the view of display field 104, embedded in a floating lock region 112. Again cursor 114 and lock region 112 are of unique colors, identifying the owner of the cursor. Region 110 may be associated with the owner of cursor 108, 114, or some third current or past client of the collaborative editor.

FIG. 4 is a pictorial view of a window 116 opened to a shared graphical object for editing using a collaborative graphic editor. Three users, represented through cursors 130, 138 and 140, appear in the view of the shared graphical object appearing in display field 117. A plurality of subobjects appear in the view including a text segment 118, a line drawing 120 of a train, a second text segment 122, a line drawing 123 around spacecraft object 124, moon object 125, space traveler object 126 and planet object 127, as well as a third text segment 128. A visual attribute of each region, or its border, indicates some associational status between the region and a user. Regions 142, 134 and 123 are user selected regions and may be cancelled by their respective establishing users at any time. The user selected regions may be locked against manipulation by other users, or may be used to merely indicate ownership.

Each user cursor 130, 138 and 140 has its own distinguishing color. Each cursor appears within one of cursor lock regions 132, 136 and 144, which also have distinguishing visual attributes, preferably a unique color. Again, the cursor lock regions are floating and transitory, arising when a cursor is free of the user selected region or cursor lock region of another. The shape and size of cursor lock regions are selectable by the user. For example, the owner of cursor 138 has selected a circular cursor lock region 136, while the owner of cursor 140 has selected a square cursor lock region 144. The owner of cursor 130 has selected an object lock region 132, which takes on the shape of underlying object 125.

Figure 5:
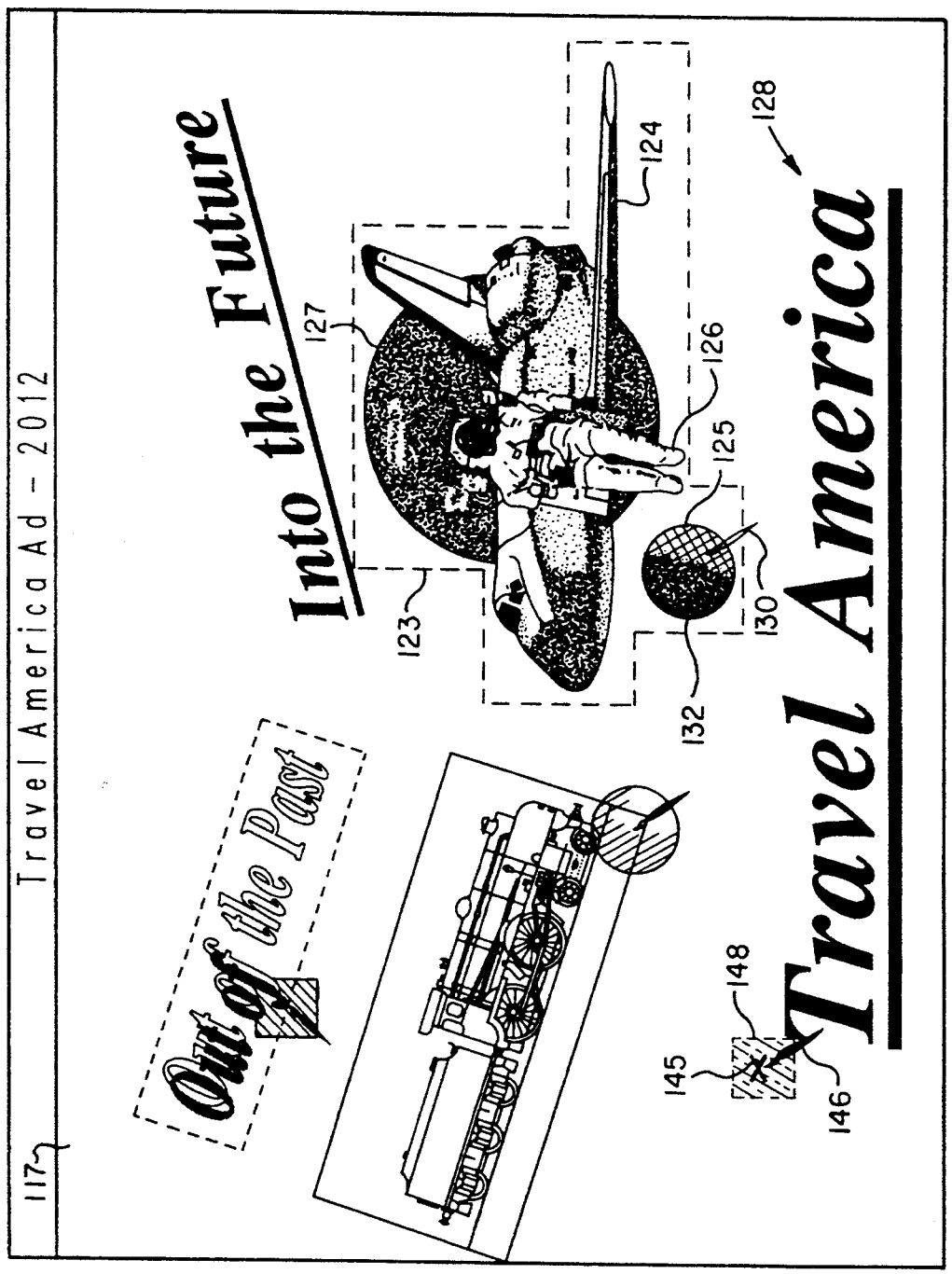

FIG. 5 is a pictorial view illustrating entry of a fourth user, represented by cursor 146, to the view of display field 117. The user of cursor 146 has initiated selection of a new region by generating a select point 145, indicated by an "X" displayed in display field 117. Cursor 146, like other cursors, is identified as to its user by a color. It is surrounded by a square cursor lock region 148, which is also identified by color as to owner.

Figure 6:
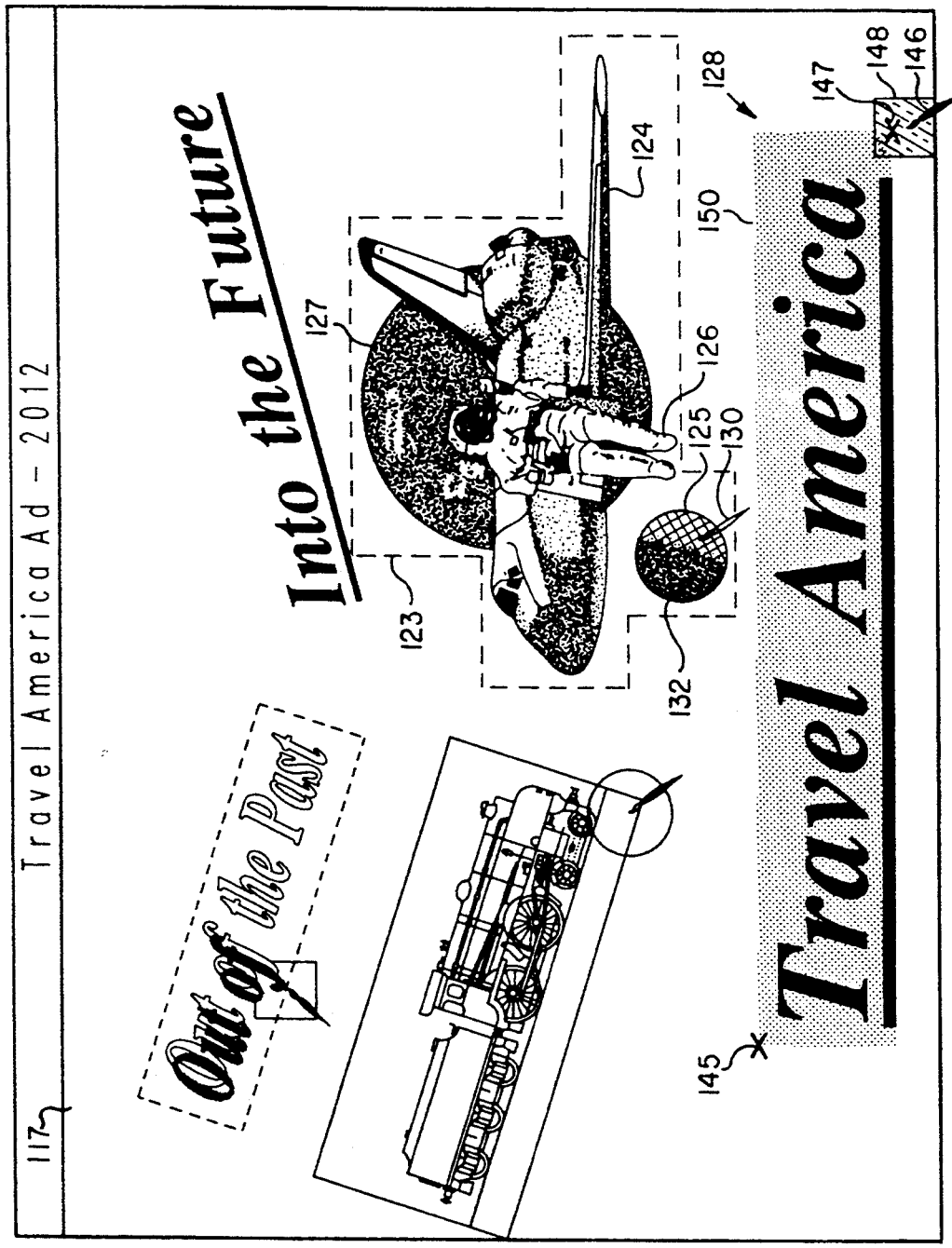

FIG. 6 is a pictorial view illustrating completion of a select region by the user of cursor 146. By selection of a second select point 147 and by request of construction of a rectangle, a select region 150 is painted to display field 117. Select region 150 is indicated by close hatching in the figure, and like other user associated regions, has some visually distinguishing attribute to identify it to other users as to owner and type. A display style is preferred for making this indication.

Figure 7:
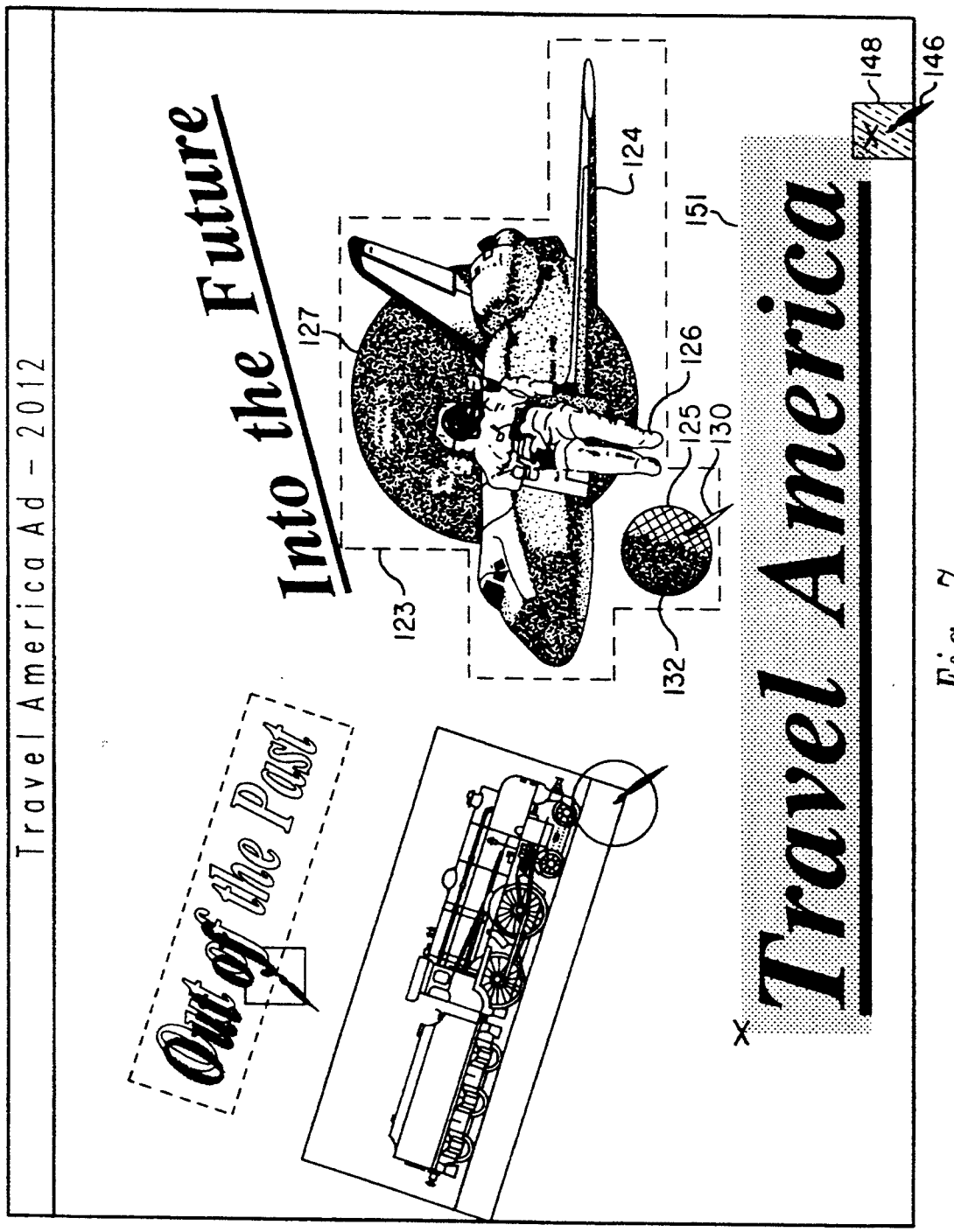

FIG. 7 is a pictorial view illustrating selection by the user of cursor 146 of an associational type for select region 150. Again, such a type may be simple "ownership" or creation of a user select lock region. The associational change is indicated by a change in the visual attribute, or display style, of the region, here for a user select lock region 151. Different types of associations may also be given different visual attributes such as different forms of cross-relating or color shading.

Figure 8A:
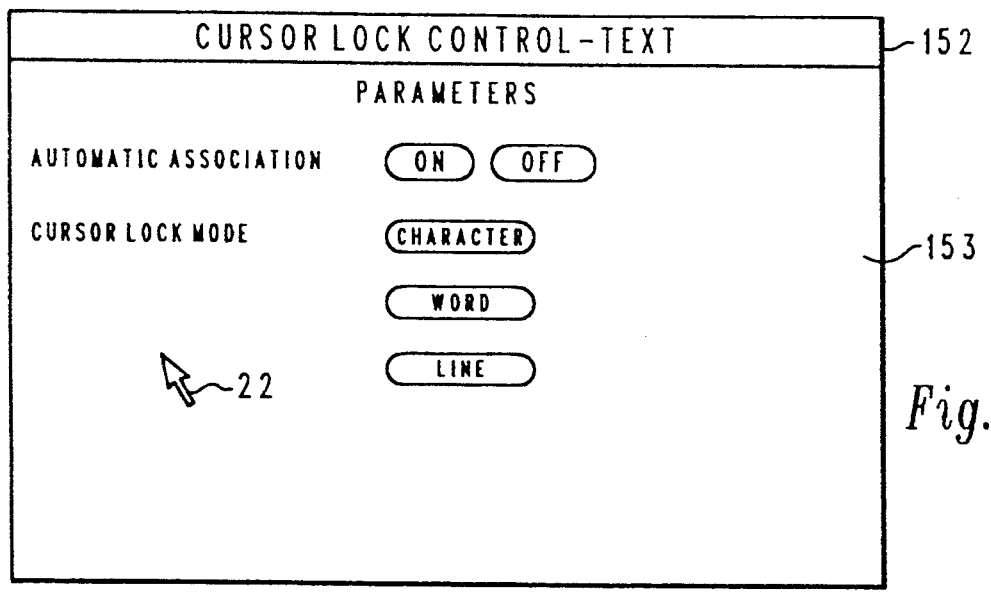
FIGS. 8A-8C are pictorial views of windows opened to select lock modes and user selectable regions for utilization with the system and method of the present invention.
Figure 8B:
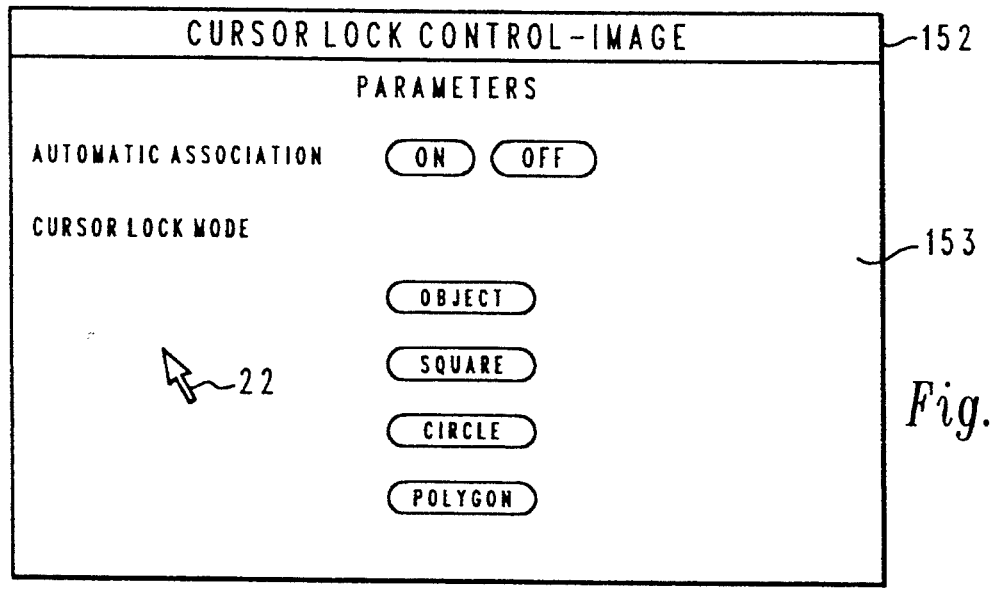
Figure 8C:
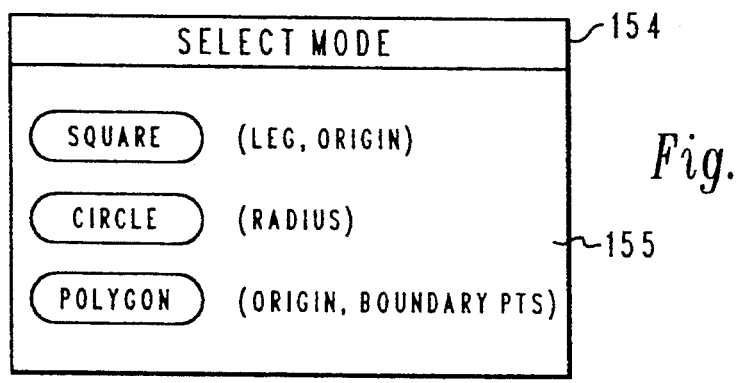

FIGS. 8A-8C are pictorial views of two windows 152 and select mode window 154 opened to control features for selecting cursor lock mode parameters. Referring to FIG. 8A, through display field 153 and mouse pointer 22 a user may select to have a lock region automatically attach to his or her assigned cursor in a text application by selection of the ON or OFF buttons. Upon selection of automatic association, the user selects a mode of lock. Character, word and line modes are generally appropriate for text editing. Although one being skilled in the art will appreciate that other modes such as sentence, paragraph or page may be utilized. FIG. 8B depicts the selection of a lock region for an image or graphics application. For example, selection of the "POLYGON" button is a mode typically more appropriate for pictorial or graphical editing. The "user defined" mode points a user to define an irregular lock region by specifying various vertices. Alternatively, an object containing graphical or textual information may be selected as a lock region by selecting the "OBJECT" button. Similarly, a user may select the "SQUARE" or "CIRCLE" buttons to elect a lock region in those shapes.

FIG. 8C shows how a user may define various shapes for a select region. Display field 155 of window 154 includes three buttons selectable by mouse, a "SQUARE" button, a "CIRCLE" button and a "POLYGON" button. Selection of any of the three requires identification of certain parameters, such as radius for a circle. A plurality of boundary points will need to be specified for the POLYGON selection. After specifying a select mode in this manner, subsequent select operations by that user will take on the shape specified by the chosen select mode.

Figure 9:
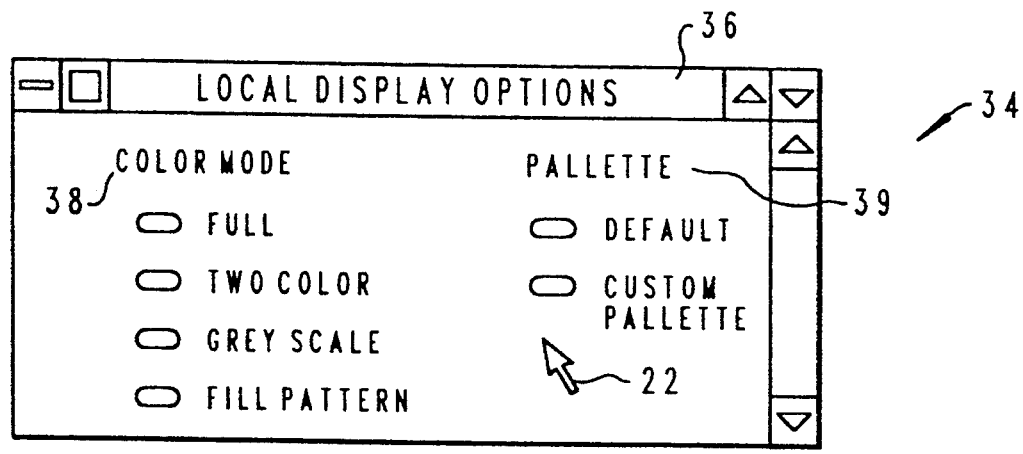
FIG. 9 is a pictorial view of a window for a user interface relating to control features of the present invention.
Figure 10:
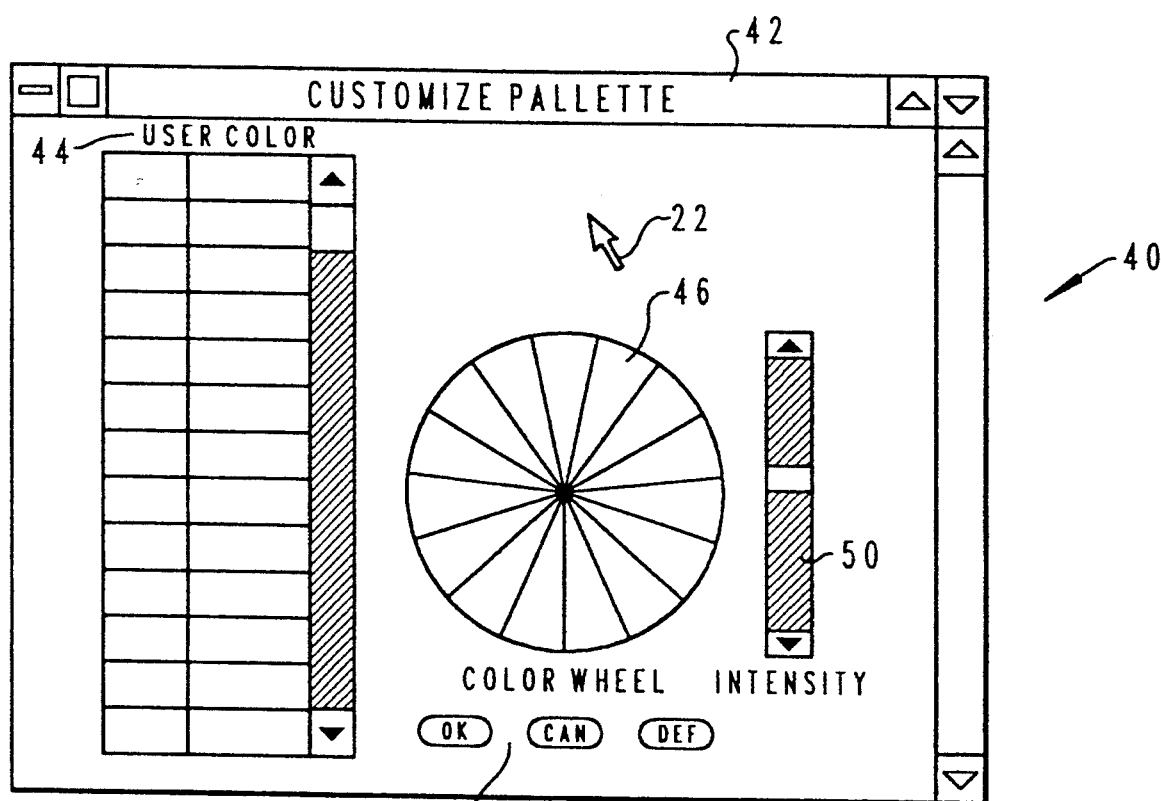
FIG. 10 is a pictorial view of a window for a user interface relating to control features of the present invention.

A network server generates default colors for the cursor assigned each user upon log on to the system. However, the system affords a user the right to locally modify the interface in a number of ways. Such modifications are supported through window 34 of FIG. 9 and window 40 of FIG. 10. As illustrated in FIG. 9, a window 34 is labelled in its name bar 36 for "Local Display Options." Four selections are provided relating to color mode 38. The selections are: full, where each user receives a distinct color; "two color", which provides one color for the user's own cursor and another color for all other user cursors; a "grey scale", which varies the intensity of each cursor on a monochrome screen; and a "fill pattern", which uses backgrounds such as hatching, parallel lines or flashing to distinguish one cursor from another. The color mode selected extends to user selected and defined association of lock regions as they occur within the shared data object and to the cursor assigned a user.

A palette option 39 relates to a selection of colors in the full color mode. The default button invokes the system established colors. A custom palette button generates window 40 illustrated in FIG. 10. In window 40, a user can select new colors for each user. Color selection allows those who are partially color blind to select a palette of distinguishing colors. A user/color table 44 appears in the display field of window 40. Upon selection of a particular user, a particular color may be selected from color wheel 46. The intensity of the color may be varied by manipulating a scroll bar 50. Selection is made by button from amend buttons 48. Buttons 48 also include a cancel button and a default selection button, which restores the originally assigned color to a particular user.

Figure 11A:
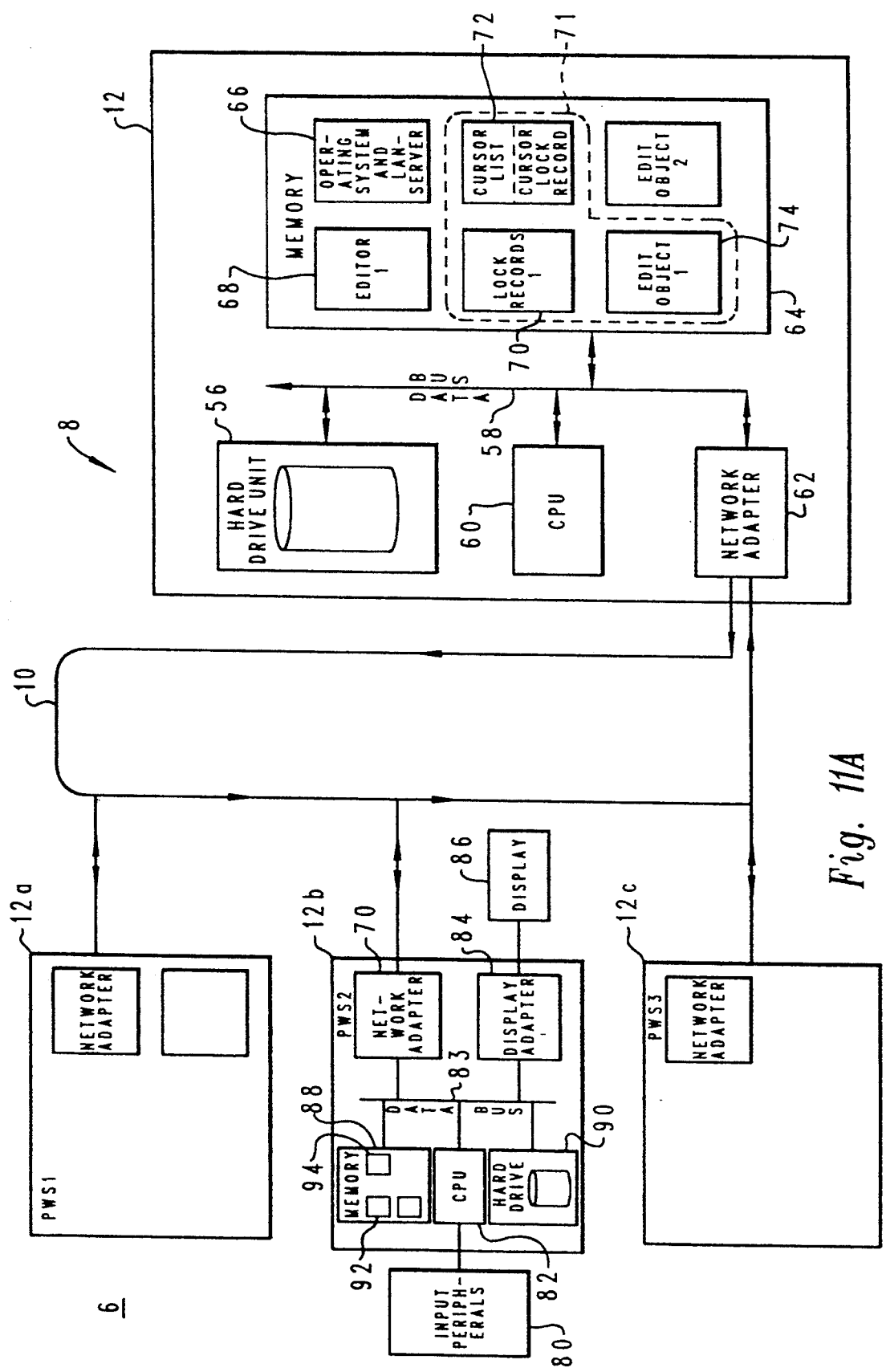
FIGS. 11A and 11B are a block diagram of a local area network illustrating distribution of data objects supporting the system and method of the present invention.

FIG. 11A depicts a block diagram of local area network 8 for supporting a collaborative computer based editing system 6 in the preferred embodiment. Server 12 communicates with computers 12a–12n over a communications channel 10. Local area network 8 is depicted in a token ring geometry however, other geometries are possible. Server 12 is a conventional computer such as an IBM Personal System/2 or AS/400 system programmed to practice this invention, and includes a central processing unit 60, a memory 64, and a network adapter 62 for formatting outgoing transmissions and for deformatting incoming transmissions. Server 12 includes a hard drive unit storing a plurality of shared data objects pending a request for access by one or more users. Such a request results in the transfer of the data object to computer memory 64 over data bus 58. A number of objects exist within memory 64. An operating system and local area network server 66 are represented as one object. An editor program 68, an association/lock list 70 and a cursor list 72 are associated with a particular edit object, here a first edit object 74, to provide a cooperative machine for generation and modification of the shared data object. Additional edit objects may simultaneously exist.

Users access the shared data objects through computers 12a–12n. Computer 12b is a typical example. A computer 12b operates as a personal workstation communicating with computer 12. Schematically the personal workstation 12b is substantially similar to computer 12, and includes a network adapter 78, a display adapter 84, a hard drive unit 90, a central processing unit (CPU) 82 and an addressable memory Components of personal workstation 12b transfer data over a data bus 83. CPU 82 directly controls input peripherals 80 which may include a keyboard and a mouse. Display adapter 84 drives a display device upon which windows are generated. Memory 88 includes a replica 92 of document 71 accessed by the user of personal workstation 12b. Replica 92 is accessed to change a user's personal view of the shared data object without the necessity of burdening network 10 for transfer of the data to support the private view. Also present is a command structure 94 for use in establishing a communications session on network 8.

The machine for effecting changes in first edit object 74 are its associated editor 68, association/lock list 70 and cursor list 72. Document 71 constitutes association/lock list 70, cursor list 72 and a target edit object 74. Cursor list 72 is a record of each user currently accessing the first edit object 74. Association/lock list 70 includes lock regions generated by a movement of a cursor into an unlocked area of edit object 74 and those lock regions as have been established by users as well as other regions associated with users. Cursor list 72 is updated whenever a new user accesses edit object 74 or when a user logs off an edit object. Entry records in association/lock list 70 may vary with movement of cursors and with the exercise of select and deselect operations by users. An association/lock record includes a start point, an end point, an association type and a user identification.

Figure 11B:
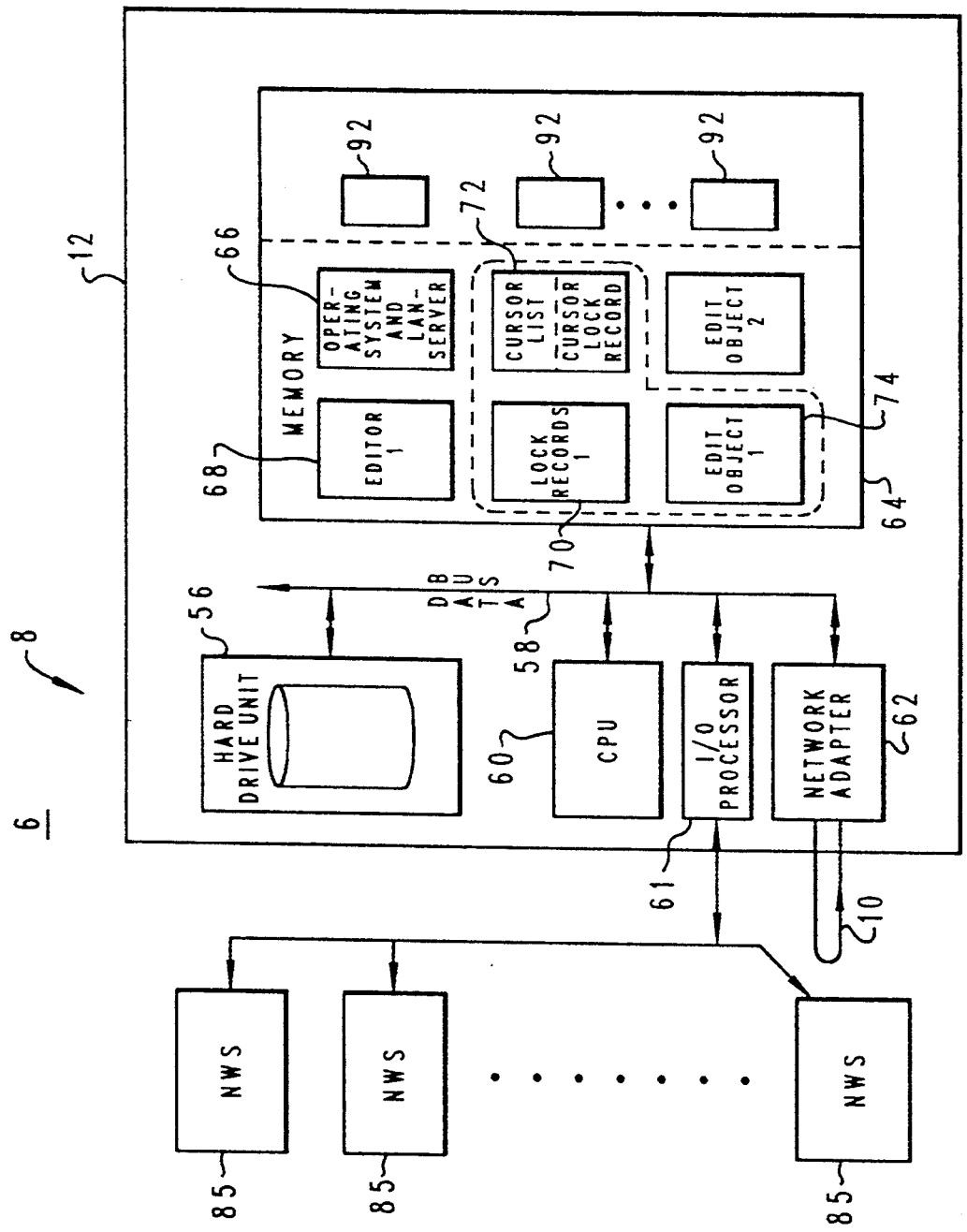

FIG. 11B depicts a block diagram of an alternate embodiment of supporting collaborative computer-based system 6. FIG. 11B is similar to FIG. 11A, except that replicas 92 of document 71 for clients 12A–12C are contained in memory 64 and executed within server 12 Input/output processor 61 communicates with a plurality of non-programmable workstations (NWS) 85. In this embodiment, server 12 becomes a single computer system running multiple processes, such as an IBM Application System/400 attached to multiple non-programmable workstations. Each non-programmable workstation 85 has a corresponding replica 92 in memory 64.

Figure 12A:
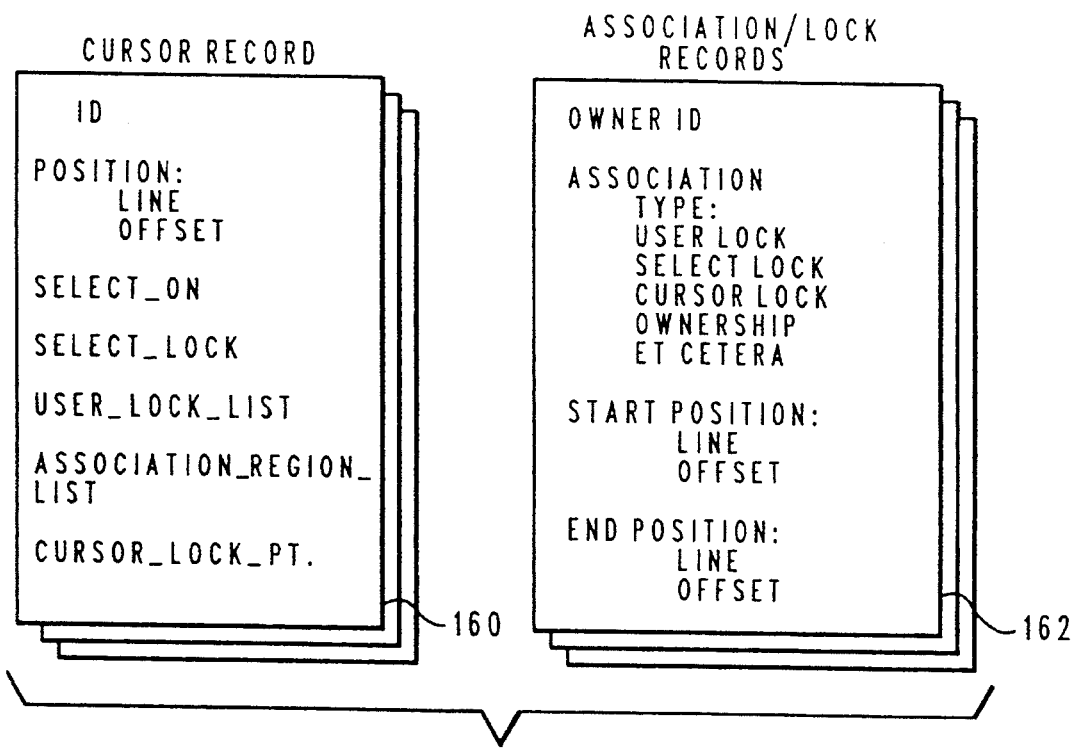
FIGS. 12A and 12B are depictions of data records used in practicing first and second embodiments, respectively, of the present invention.
Figure 12B:
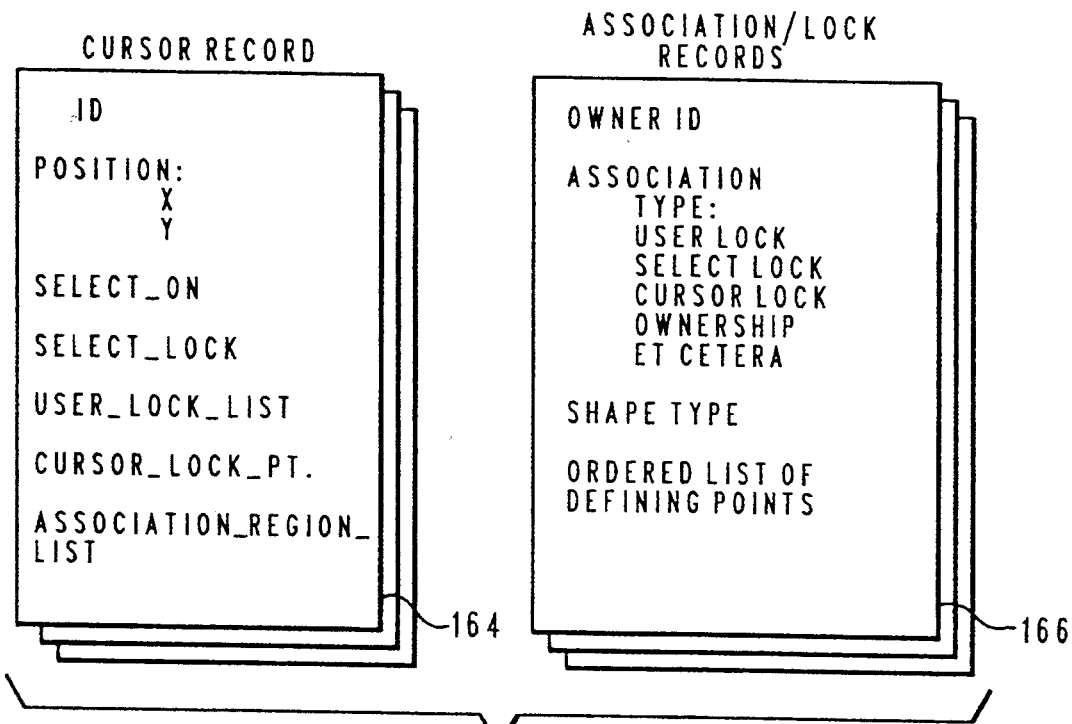

FIGS. 12A and 12B illustrate data records 160, 162, 164 and 166 used in practicing first and second embodiments, respectively, of the invention. The embodiments relate to collaborative text editing and collaborative graphical or pictorial editing.

The current user list for a collaborative text editor includes a list of pointers to cursor records 160, one of which is illustrated in detail. One cursor record exists for each current user. A record 160 includes a unique identifier for the cursor. A current position record indicating the line of text and the offset within the line for the cursor is maintained, subject to update with each command resulting in a change of position. Record 160 includes two related fields utilized in selection of a new region for locking or other purposes. A select on field is a flag indicating a select region is active. A select region is a freshly identified region not identified as to associational type. The select lock field is a pointer to a record for the select region.

The user lock list is a list of pointers to lock records of regions which are locked against other users. The cursor lock is field containing a pointer to a lock record for the floating lock associated with the cursor. A pointer may or may not be present. Finally, an Association region list is a collection of fields containing pointers to "association/lock" records which are associated in some way with a user, other than by being locked against manipulation by other users.

Record 162 is characteristic of such Association/Lock records. The record includes the identification number of the owning cursor. The association type is identified, e.g. select lock, user lock, cursor lock, ownership, et cetera. Fields are provided to identify the beginning and end of the region, in terms of line and offset.

FIG. 12B illustrates data structure records utilized for a collaborative graphics editor. The current user list for a collaborative graphics editor includes a list of pointers to cursor records 164, one of which is illustrated in detail. One cursor record exists for each current user. A record 164 includes a unique identifier for the cursor. A current position record indicating the X-axis and Y-axis coordinates in the graph or picture for the cursor is maintained, subject to update with each command resulting in a change of position. Record 164 includes two related fields utilized in selection of a new region for locking or other purposes. A select on field is a flag indicating a select region is active. A select region is a freshly identified region not identified as to associational type. The select lock field is a pointer to a record for the select region.

The user lock list is a list of pointers to lock records of regions which are locked against other users. The cursor lock is field containing a pointer to a lock record for the floating lock associated with the cursor. A pointer may or may not be present. Finally, an Association region list is a collection of fields containing pointers to "association/lock" records which are associated in some way with a user, other than by being locked against manipulation by other users.

Record 166 is characteristic of Association/Lock records for a collaborative graphics editor. The record includes the identification number of the owning cursor. The association type is identified, e.g. select lock, user lock, cursor lock, ownership, et cetera. A field identifies the shape of the region, including squares, circles and user defined polygons. A ordered list of defining points, i.e. vertices, are maintained for the region. The list ordering is provided to identify the sequence of points connected by the boundary line of the polygon.

Figure 13:
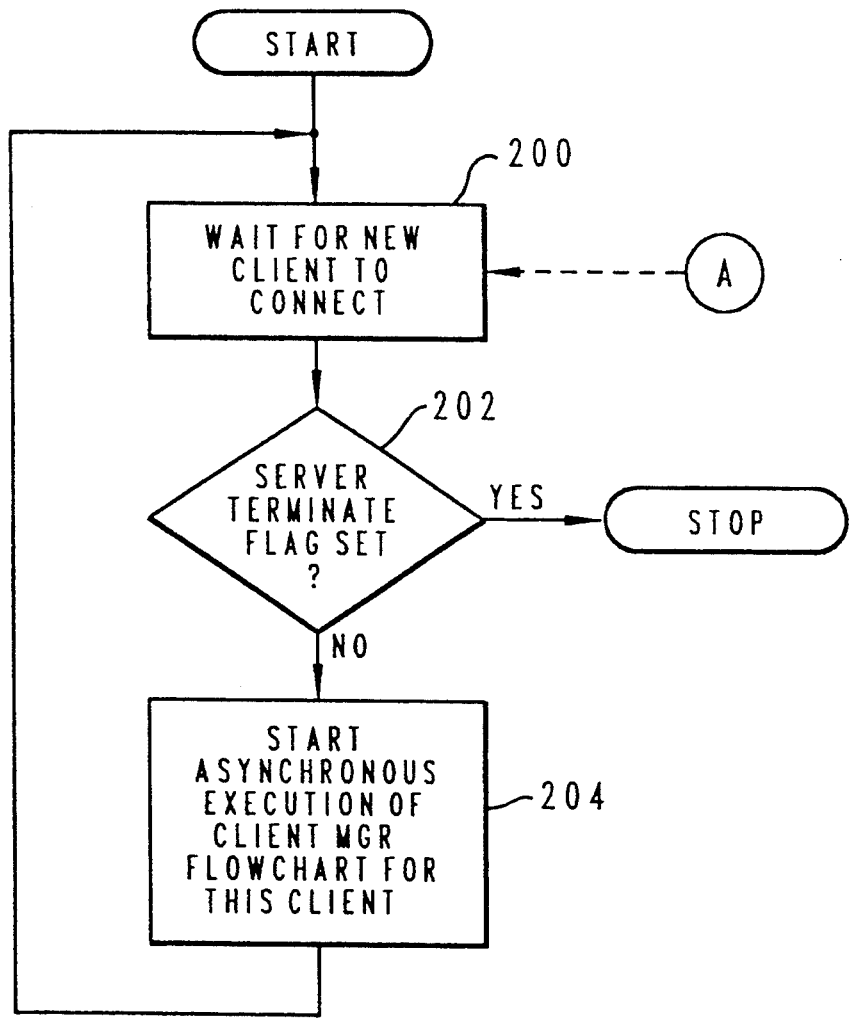
FIG. 13 is a high level flow chart depicting access by a client to a collaborative data processing system.
Figure 15:
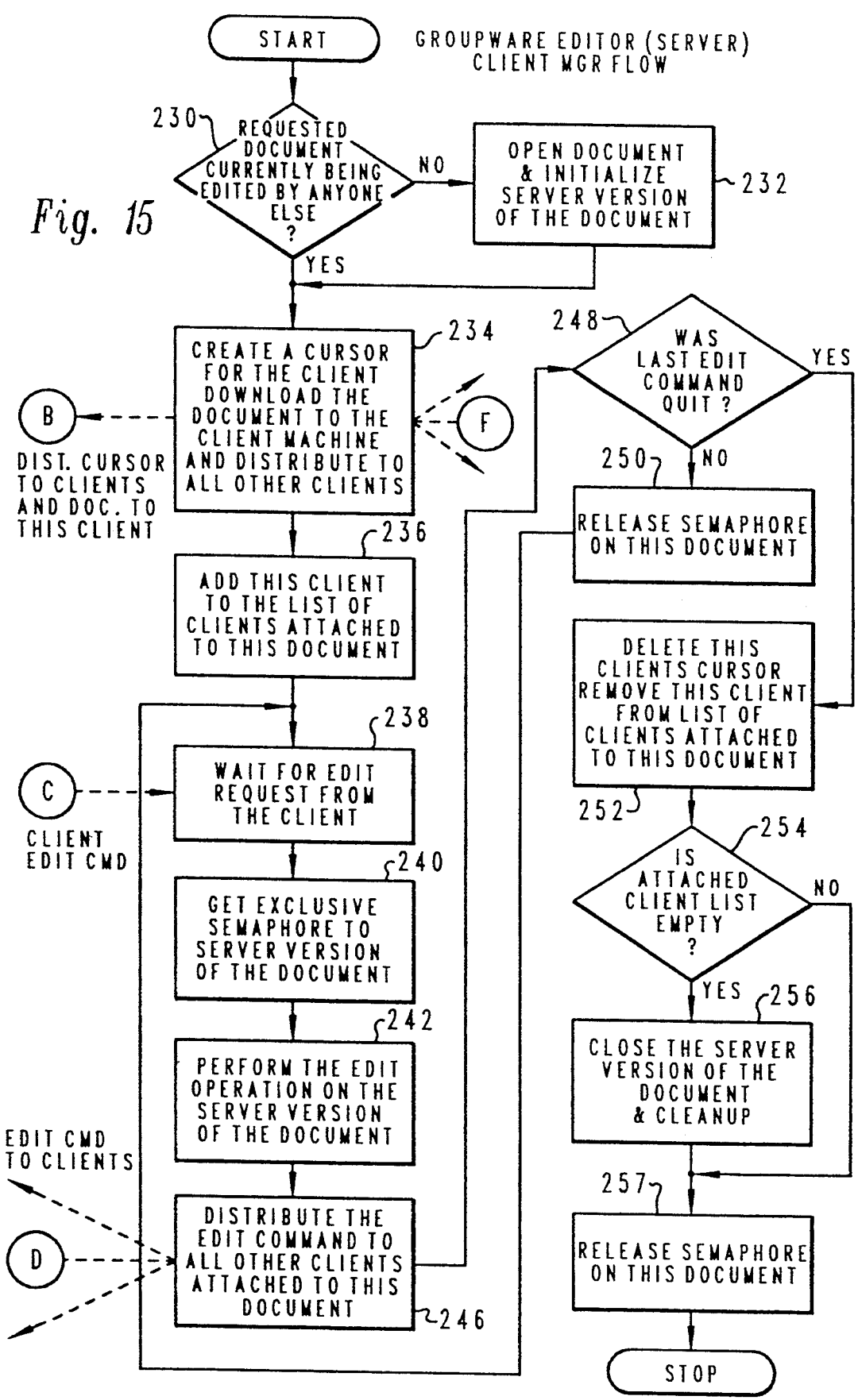
FIG. 15 is a high level flow chart depicting operation of a collaborative editor at a server incorporating the method and system of the present invention.

FIG. 13 is a high level flow chart illustrating access by a client to a collaborative editing system of either the text or graphics/pictorial type. The initial state of the system is to have a server waiting for client requests for connection (block 200). The server is normally blocked and requires little in the way of computation resources of the host machine. Upon a user request, a connection is established. Decision block 202 reflects that the user may be a pseudo user, utilized to pass a terminate command to the server by setting a terminate flag. The YES branch from block 202 reflects such a flag. More typically however, an actual user is connected, resulting in execution of block 204, which is establishment of an Asynchronous Client Manager for the requesting client. The client manager is illustrated in FIG. 15 below.

Figure 14:
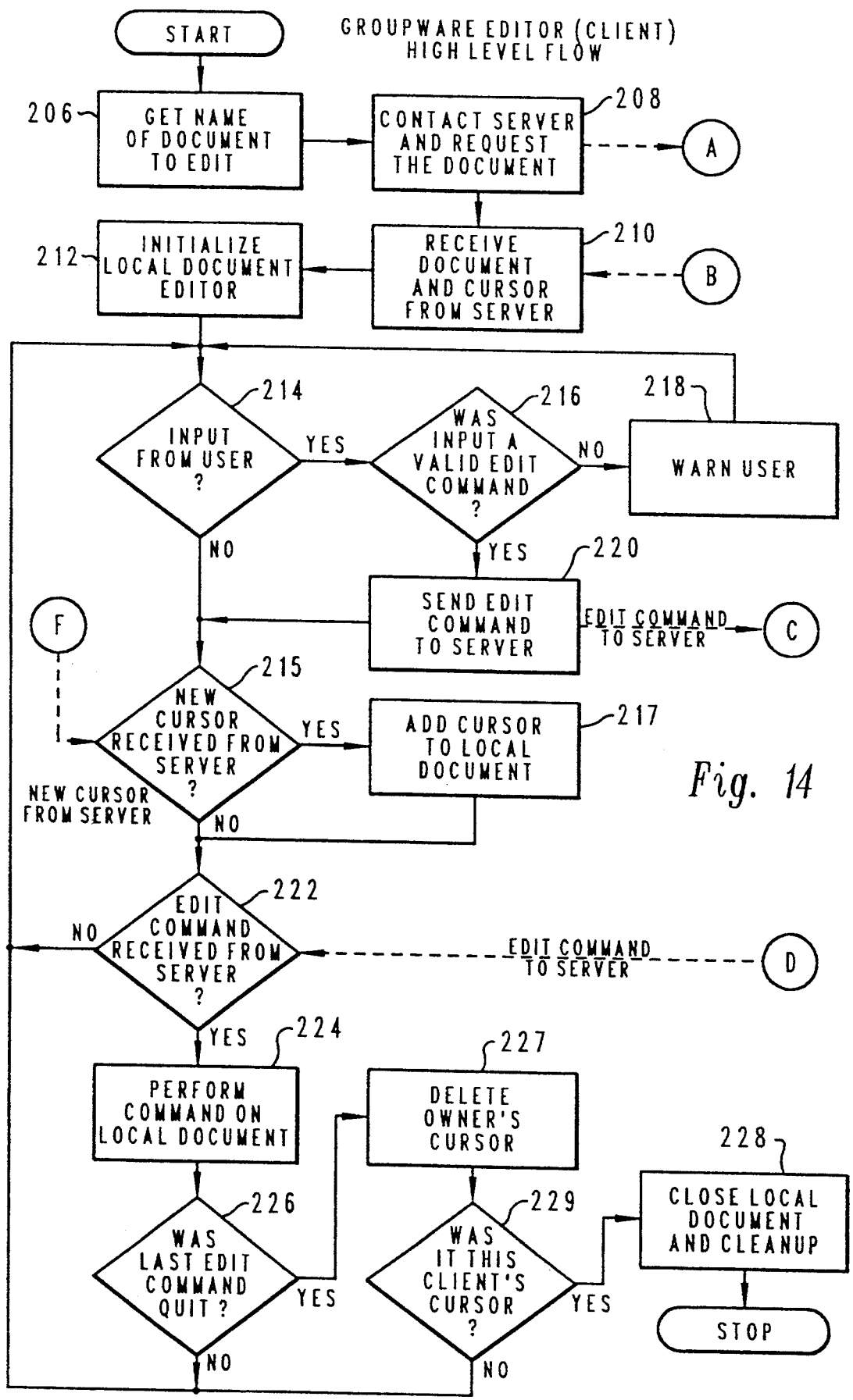
FIG. 14 is a high level flow chart depicting operation of a collaborative editor at a client terminal incorporating the method and system of the present invention.

Referring now to FIG. 14 there is depicted a high level flow chart depicting operation of a collaborative editor for either text or graphics application at a client. The process begins at block 206 with identification of a shared document to edit. Next, at block 208, the client contacts the server and requests the document identified at block 206. The transmission out of the request is indicated by the letter "A". Receipt of the transmission by the server, also indicated by the letter "A", was indicated at block 200 of FIG. 13 above. At block 210 the client receives its copy of the document from the server, indicated by the letter "B". The document includes a target object for editing, the cursor list, cursor records, and association/lock records. The document is stored in the client memory. Finally, at block 212 a local editor is initialized. Editing can now begin.

Next, decision block 214 is utilized to determine if an input has been received from a user. If so, decision block 216 is utilized to determine if the command was valid or not. If the command is not valid, the process warns the user from block 218 and returns to block 214 analyze the next user entry. If the command is valid, block 220 is utilized to transmit the edit command to the server. The transfer point between the local editor program and the server editor program is indicated by the letter "C".

Next, response of the local editor to valid commands is detailed. First, block 215 illustrates a determination of whether or not a new cursor has been received from the server, indicated by transfer point "F." If so, the cursor is added to the local document, as depicted at block 217. If no new cursor is received from the server, the process passes to block 222 where a determination is made as to whether or not an edit command has been received from the server. Edit commands can originate either locally or from another user. However, no edit command is acted upon until received by the client from the server. Accordingly, blocks 214 and 222 are repeatedly executed for the purpose of identifying commands for transmission to server and for receiving commands from the server.

Upon return of an edit command from a server editor, indicated by an transfer point "D", block 224 is utilized to perform the command on the local document. It will become clear from the discussion below that such commands can come from client managers for other users. The operations occurring in block 224 are explained in detail below with reference to FIGS. 16–24. They include edit operations, region association operations, cursor movement and other steps. Decision block 226 is utilized to determine if the command is a quit command or an exit command. If so, the process passes to block 227 which illustrates the deletion of the owner's cursor and block 229 depicts a determination of whether or not the cursor deleted was this client's cursor. If not, the process returns to block 214 to await the next command. If the cursor deleted was this client's cursor, block 228 is utilized to close the local document and to perform any other local cleanup functions, after which the local process is discontinued. The NO branch from block 226 returns to block 214 and the process awaits the next command.

FIG. 15 is a high level flow chart depicting a client manager and collaborative editor being processed at the server. The process begins at block 230, which is utilized to determine if the request target object or document is currently being edited by anyone else. If not, block 232 is utilized to open the document and to initialize the appropriate data structures to support collaborative editing. Once an open document is obtained, or if it already existed, block 234 is utilized to create a cursor record for the new user. A copy of the document, including the updated cursor records and lock records, if such exist, is downloaded to the client terminal, indicated by the transfer point "B". The new cursor is distributed to all other clients, as indicated by fan-out point "F." Block 236 reflects addition of the new user to the list of clients accessing the document.

Management of client access to the target object within the document begins at block 238. Upon receipt of an edit command from the client, indicated at exchange point "C", the process utilizes block 240 to obtain a semaphore to the server version of the document. Upon obtaining the semaphore, the client manager has exclusive access to the document files. Access by clients to the document is thus serialized to preserve consistency. Block 242 may now be utilized to perform an edit operation on the server version of the document. These operations are explained in detail below with reference to FIGS. 16–24. Next, block 246 is utilized to distribute the edit command to the all of the clients attached to the current document for parallel operation on local versions of the document, as indicated at fan-out point "D." As will now be clear, the client editor depicted in FIG. 14 may receive edit commands from a plurality of client managers. Next, block 248 reflects determination of whether last edit command was a quit originating with this client manager's client If not, the process passes to block 250 which illustrates the release of the semaphore to the document.

A client instruction to quit results in utilization of block 252 to remove the client from the list of clients attached to the document and in deletion of the client's cursor record. Block 254 is utilized to determine if a client was the only remaining client attached to a document. If yes, block 256 is used to close the document and to perform any required cleanup steps. Next, block 257 illustrates the release of the semaphore for the document. The client manager for the withdrawing client only is closed.

Figure 16:
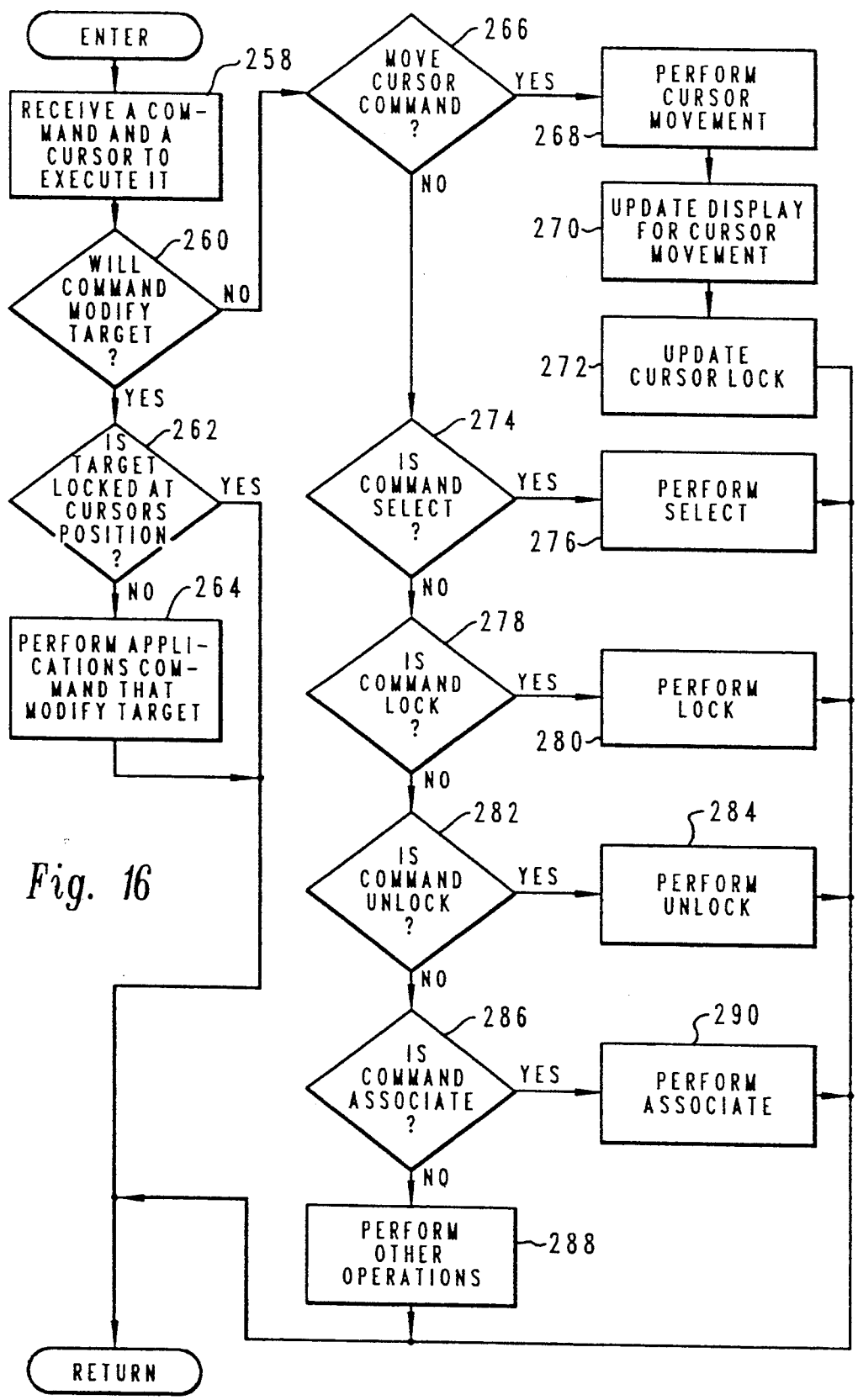
FIG. 16 is a flow chart depicting operation of the collaborative editors of FIGS. 14 and 15 relating to response to a command received from a user of the system.

FIG. 16 illustrates operations occurring at blocks 224 and 242 of a client editor running on a local terminal and a client manager running on a server, respectively. The operations are largely parallel, however, such differences as exist are noted. Referring now to FIG. 16, a flow chart depicting operation of the collaborative editor is depicted. The process is initiated at block 258 upon receipt of a command and a cursor with which to execute the command. Block 260 is utilized to determine if the command is one which will modify the target object of the document in some way.

If a command is one which modifies the target object, block 262 is utilized to determine if the cursor is located at a position in the target object which is locked against that cursor. If not, block 264 is utilized to perform the applications command which modifies the target object. This may involve commands similar to commands utilized by a graphics editor, such as Corel Draw, available from Corelsystems Corp., 1600 Carling Avenue, Ottawa, Ontario, or any one of a number of text editors and may include save and edit commands. Appropriate modification of the display is made if the operation is in the client editor's view. Where the target object is locked, the change is not entered and the process is returned to the client editor or client manager, as appropriate. Determination of target object lock status is explained below with reference to FIGS. 18A and 18B.

Commands which do not modify the target object of a document include commands controlling cursor movement and commands involving selection and deselection of regions of the target object for locks or other association status. Also among such commands are saves of the target object and quit commands. However, the first group of commands are of primary concern here. Following the NO branch from decision block 260, decision block 266 is utilized to determine if the command was one to move a cursor. If so, block 268 is utilized to perform the cursor movement, i.e. to update the cursor record 160 or 164 for the cursor. Next, if the process is operating on a client editor, the display is updated to reflect the new cursor position (See FIGS. 17A and 17B). Next, at step 272 the cursor lock is updated (for detail see FIGS. 19A and 19B). As explained below a cursor lock may or may not be returned depending upon the new location of the cursor. The process is then returned to the client editor or manager, as appropriate.

If the command was not a cursor movement command, the NO branch from decision block 266 advances the process to decision block 274. Block 274 is utilized to determine if the command is a select command, which is utilized to identify a portion of a shared data object for some form of association with a user. If so, block 276 is utilized to perform the selection operation (See FIGS. 20A and 20B below).

If the command was not a select command, the NO branch from decision block 274 advances the process to decision block 278. Block 278 is utilized to determine if the command is a lock command, which is utilized to convert a select region to a user select lock region in a shared data object. If so, block 280 is utilized to perform the lock operation (See FIG. 21 below).

If the command was not a lock command, the NO branch from decision block 278 advances the process to decision block 282. Block 282 is utilized to determine if the command is an unlock command, which is utilized to remove a user select lock region in a shared data object. If so, block 284 is utilized to perform the unlock operation (See FIG. 23 below).

If the command was not an unlock command, the NO branch from decision block 282 advances the process to decision block 286. Block 286 is utilized to determine if the command is an associate command, which is utilized to convert a select region to a user association region in a shared data object. If so, block 288 is utilized to perform functions similar to those described above with respect to block 264, including save and edit commands. (See FIG. 22 below).

Execution of the remaining possible commands, which do not implicate conflict with lock regions, is provided for by utilization of block 288 to carry out the command. All operations of the process end in return to the client editor or the client manager as appropriate.

Figure 17A:
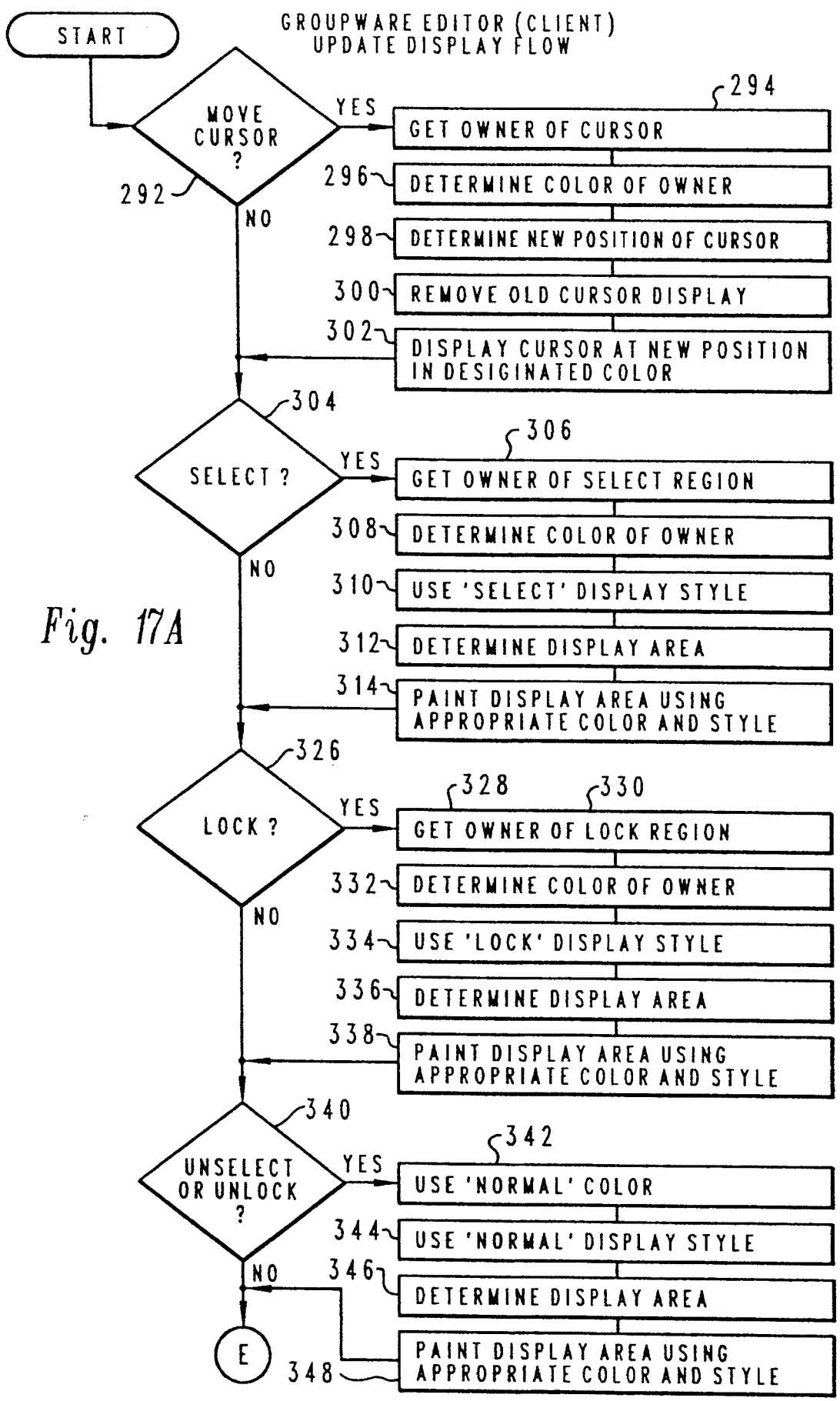
FIGS. 17A and 17B are a flow chart relating to update of a client display in a group editing system provided by the present invention.
Figure 17B:
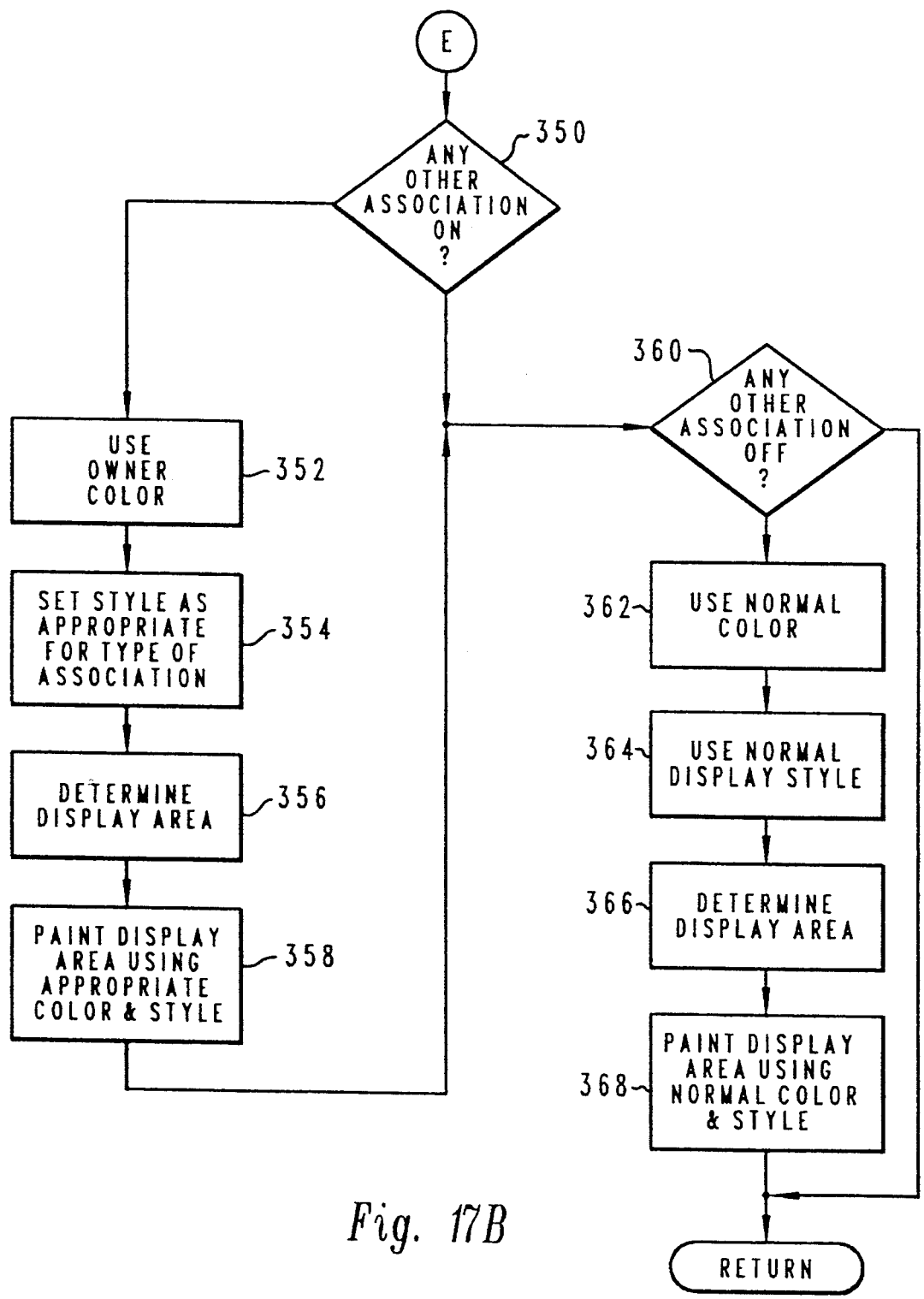

FIGS. 17A and 17B relate to the process of updating a display on a local terminal. Generally no display is provided at a server. A display update occurs after modifications to the document, after a cursor move command, and after an operation relating to user association regions. The flow chart of FIGS. 17A and 17B relates to the latter two cases and may be presumed to be executed after the operations contemplated by blocks 276, 280, 284, or 290.

The process of updating a display begins at decision block 292, which begins again the process of identifying the nature of the edit command received. Decision block 292 is utilized to determine if the command was a move cursor command. If so, a series of blocks 294, 296, 298, 300 and 302 are utilized to identify the owner of the cursor, to determine the color for the owner, to determine the new position of the cursor, to remove the old cursor and to display the cursor at its new position in the designated color.

The process of updating a display continues at decision block 304. Decision block 304 is utilized to determine if the command is to select a region. If so, a series of blocks 306, 308, 310, 312 and 314 are utilized to modify the region to identify it as selected and to identify the selecting user. The blocks specifically provide for identifying the owner of the select region, recovery of a color for the owner, recovery of a "SELECT" display style, determination of the region in the display for which modification of the appearance is required and, finally, painting the region using the owner's color and the SELECT display style.

The process of updating a display continues at decision block 326. Decision block 326 is utilized to determine if the command is a command to lock a region. If so, a series of blocks 328, 330, 332, 334, 336 and 338 are utilized to modify the region to identify it as locked and to identify the owner. The blocks specifically provide for identifying the owner of the lock region, recovery of a color for the owner, recovery of a "LOCK" display style, determination of the region in the display for which modification of the appearance is required and, finally, painting the region using the owner's color and the LOCK display style.

The process of updating a display continues at decision block 340. Decision block 340 is utilized to determine if the command is a command to unselect or to unlock a region. If so, a series of blocks 342, 344, 346 and 348 are utilized to restore the region to a "normal" appearance. The blocks specifically provide for recovery of the normal display color, recovery of a normal display style, determination of the region in the display for which modification of the appearance is required and, finally, painting the region using the normal color and display style.

Referring to FIG. 17B, the process of updating a display continues at decision block 350. Decision block 350 is utilized to determine if any other associations are "ON" in a view. If so, a series of blocks 352, 354, 356 and 358 are utilized to modify the region to identify the association and to identify the its owner. The blocks specifically provide for recovery of a color for the owner, recovery of an appropriate display style, determination of the region in the display for which modification of the appearance is required and, finally, painting the region using the owner's color and the appropriate association display style.

The process of updating a display continues at decision block 360. Decision block 360 is utilized to determine if associations are off for regions in a view. If so, a series of blocks 362, 364, 366 and 368 are utilized to display the regions in a "normal" appearance. The blocks specifically provide for recovery of the normal display color, recovery of a normal display style, determination of the region in the display, and painting the region using the normal color and display style. After completion of a display update processing is returned to the appropriate location in the local editor.

Figure 18A:
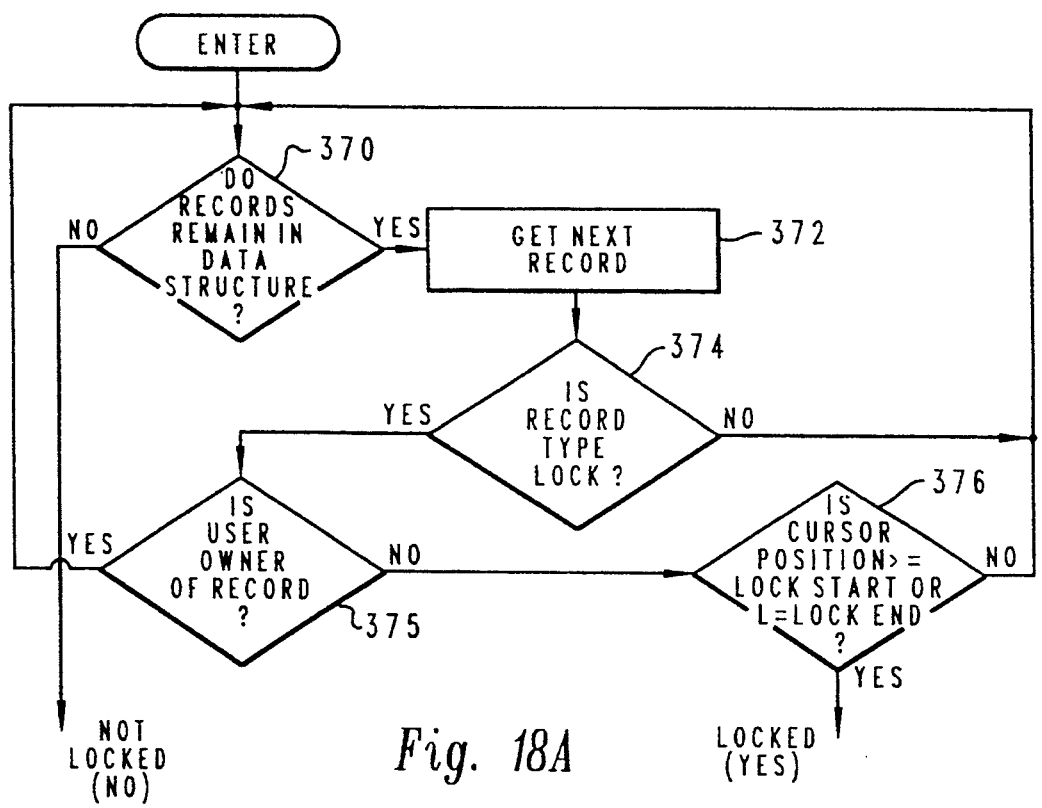
FIGS. 18A and 18B are flow charts relating to determination of whether a cursor position is locked against editing through that cursor in first and second embodiments of the invention.
Figure 18B:
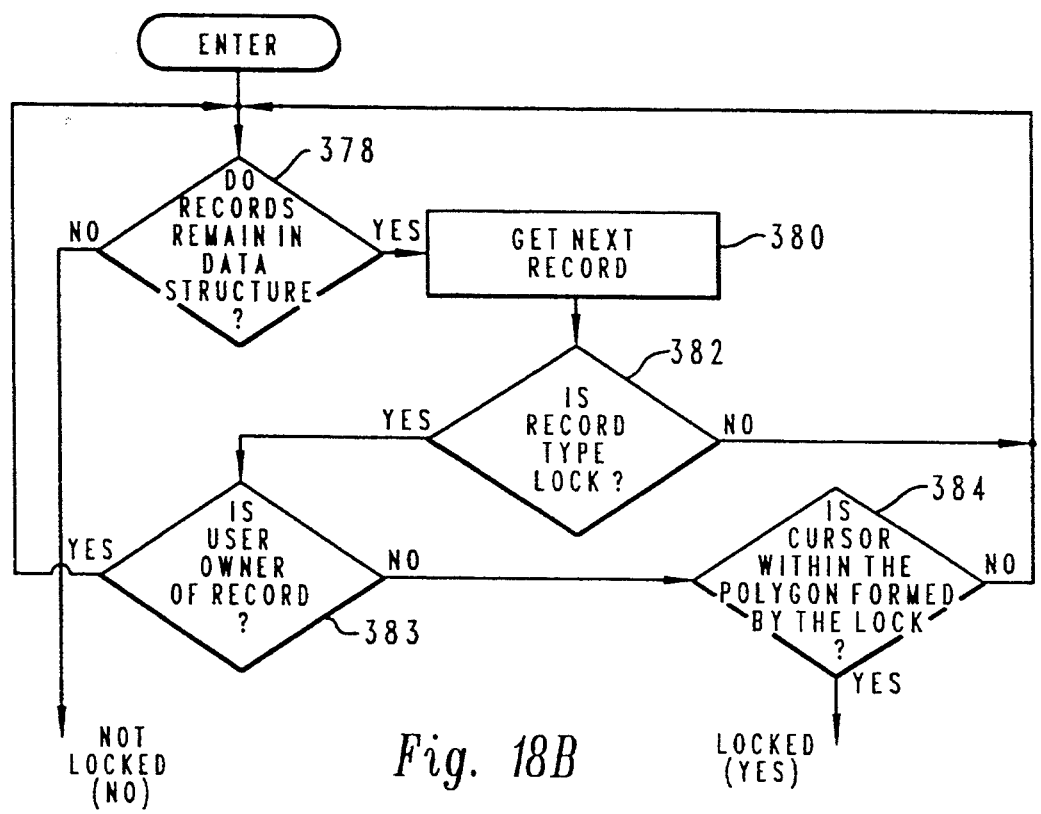

FIGS. 18A and 18B are flow charts relating to determination of whether a cursor is locked against editing at its current position. The figures relate to first and second embodiments of the invention, that is a text editor context and a graphics or pictorial editor context, respectively. Referring to FIG. 18A, which relates to a text editor, the process begins with utilization of decision block 370 to determine if association/lock records, including cursor lock records, exist which have not been examined. If not, no lock blocks the operation requesting the determination and the process is returned. If records exist however, they must be examined. Next, at block 372, the next record is recovered. Decision block 374 is utilized to determine if the record is a lock type, including user locks, select locks or cursor locks. If not, the record is irrelevant and the process returns to block 370. If the record is a lock type, decision block 375 is utilized to determine if the user is the owner. If so, the record is irrelevant and the process returns to block 370. Finally, decision block 376 is utilized to compare the position of the cursor and the start and end points of the lock record. If the cursor lies between the start and end points, a lock blocks use of the cursor to modify the document or to establish a select point. A locked indication is returned to the host process. If the cursor lies strictly outside of the start and end points of the record, the lock is not effective at the cursor position. The process returns to block 370 for evaluation of the next record. Only upon clearing all records is a not locked indication returned.

Referring to FIG. 18B, which relates to a graphics editor, the process begins with utilization of decision block 378 to determine if association/lock records, including cursor lock records exist which have not been examined. If not, no lock blocks the operation requesting the determination and the process is returned. If records exist however, they must be examined. Next, at block 380, the next record is recovered. Decision block 382 is utilized to determine if the record is a lock type, including either user locks, select locks or cursor locks. If not, the record is irrelevant and the process returns to block 378. If the record is a lock type, decision block 383 is utilized to determine if the user is the owner. If so, the record is irrelevant and the process returns to block 378. Finally, decision block 384 is utilized to compare the position of the cursor with the bounds of the polygon formed by the boundary points of the lock record. If the cursor lies within the polygon, a lock blocks use of the cursor to modify the document or to establish a select point. A locked indication is returned. If the cursor lies strictly outside of the polygon, the lock is not effective at the cursor position. The process returns to block 378 for evaluation of the next record. Only upon clearing all records is a not locked indication returned.

Figure 19A:
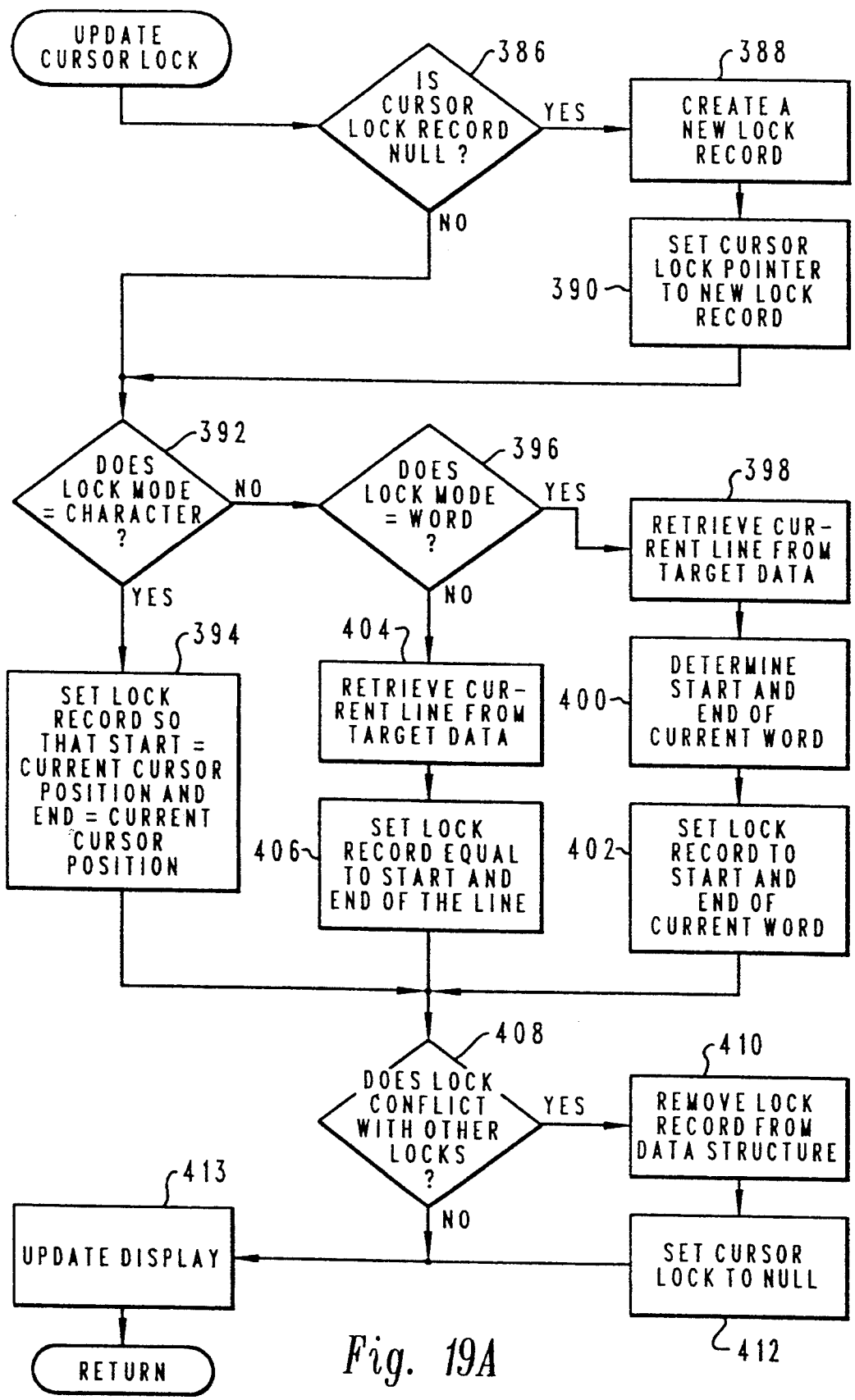
FIGS. 19A and 19B are flow charts relating to first and second embodiments of the invention, respectively, providing for updating of cursor associated lock regions within a shared data object.
Figure 19B:
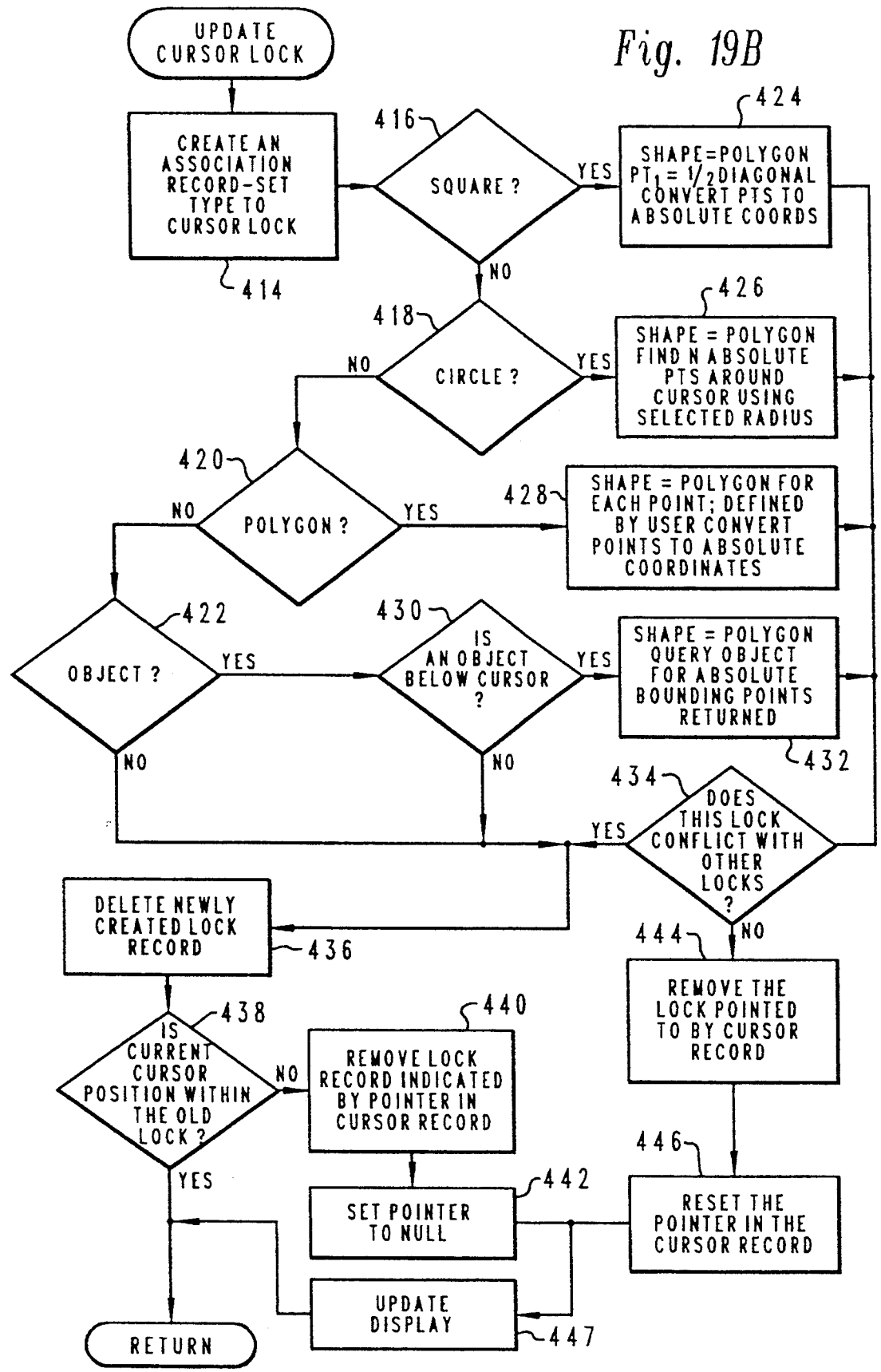

FIGS. 19A and 19B are flow charts relating updating of cursor lock regions within a shared data object upon movement of a cursor. Referring to FIG. 19A, an update process for a lock in a textual target object begins with utilization of decision block 386 to determine if the current cursor lock record is null. If so, operation blocks 388 and 390 are used to generate a new cursor lock record and to set a pointer in the cursor record to the new cursor lock record. Once a cursor lock record is available, decision block 392 is utilized to determine if the lock mode for the cursor lock is a character position. If it is, block 394 is utilized to change the start and end fields in the cursor lock record to equal the current position of the cursor. If the lock mode is not a character, the process takes the NO branch from block 392 to decision block 396, which is utilized to determine if the lock mode is equal to a word. If it is, the process takes the YES branch from block 396 to block 398. Block 398 is utilized to retrieve the current line from the target object. Next, block 400 is utilized to determine the offsets of the start and end of the current word. Next, block 402 is utilized to set the start and end fields in the cursor lock record equal to the start and end of the current word. If, at block 396 it was determined that the lock mode did not equal a word, it is assumed that the lock mode equals a line. Along the NO branch from block 396, the process utilizes block 404 retrieve the current line from the target object. Next, at block 406, the cursor lock record fields for the start and end are set equal to the start and end of the current line.

After setting the start and end fields for the lock record in any mode, decision block 408 is utilized to determine if the new cursor lock record conflicts with any other locks (for details of the analysis see FIG. 24A). If it does conflict, the new cursor lock record is removed from the document data structure (block 410) and the cursor record to the pointer is set to null (block 412). Block 413 then illustrates the updating of the display. The process then returns to the appropriate point in the editing process. If there is no conflict detected at block 408, the process returns directly to the appropriate point in the editor.

An update of a cursor lock in a graphics editing environment is somewhat more complex. Referring to FIG. 19B, operation block 414 is initially utilized to create a new, provisional cursor lock record. The pointer field in the cursor record is not changed at this time. Next, decision block 416 is utilized to determine if the lock mode is equal to a square. If it is, block 424 is utilized to generate the four absolute coordinates of the square centered on the current cursor position in the plane of the view. If the shape of the cursor lock region is not a square, decision block 418 is utilized to determine it the shape mode equals a circle. If it is, block 426 is utilized to determine a set of coordinates for a polygon which approximates a circle, i.e. a set of points equidistant from the cursor in the plane of the view. Some number N of points is selected which, given the resolution of the particular machines used, will look like a circle to the user.

If at block 418 it was determined that the shape mode was not a circle, decision block 420 is utilized to determine if the mode is user defined polygon. If so, block 432 is utilized to convert a user definition of points relative to the cursor position to absolute points for the lock record.

The graphics editing environment also allows for a cursor lock mode equal to a current object over which the cursor is located. If at block 420 it was determined that the mode was not polygon mode, block 422 is utilized to determine if object mode is in use. If yes, block 430 is utilized to query the display image to determine if the cursor is over an object. If yes, block 432 is utilized to query the object for its absolute bounding points, which are used as defining points for a polygon shaped cursor lock record.

Figure 24B:
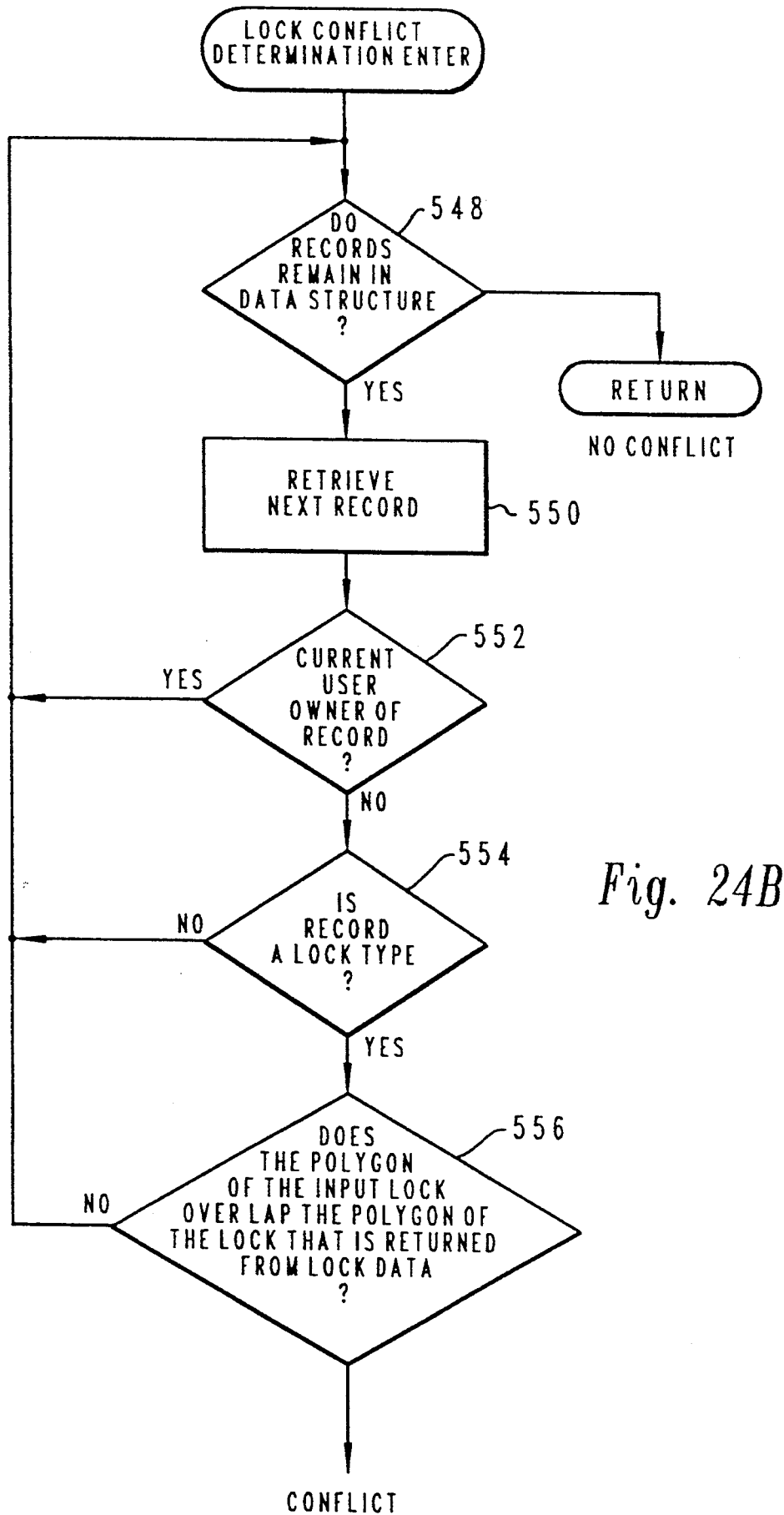

From blocks 424, 426, 428 and 432, i.e. from any definition of the bounds for a cursor lock, decision block 434 is utilized to compare the new lock record to other lock records for a possible conflict (See FIG. 24B for details). If no conflict is found the old lock record is removed (block 444) and the pointer field in the cursor record is reset the updating to the new lock record (block 446). Block 447 then illustrates the updating of the display. The process returns to the appropriate point in the editing process. If however, a conflict is found at decision block 434, or no object is found below the cursor (block 430), or the lock mode was found to not be in Object mode (block 422, implying that automatic association of a lock to a cursor is off), then block 436 is utilized to delete the newly created lock record. Next, block 438 is utilized to determine if the current cursor position is within its own old lock record. If it is, the old lock record is allowed to stand, although visually the cursor is no longer centered in its lock region. If the cursor is outside of its old cursor lock, the old cursor lock is eliminated by deletion of the lock record indicated by the cursor lock pointer in the cursor record (block 440) and resetting that pointer to null. Block 447 then illustrates the updating of the display.

Figure 20A:
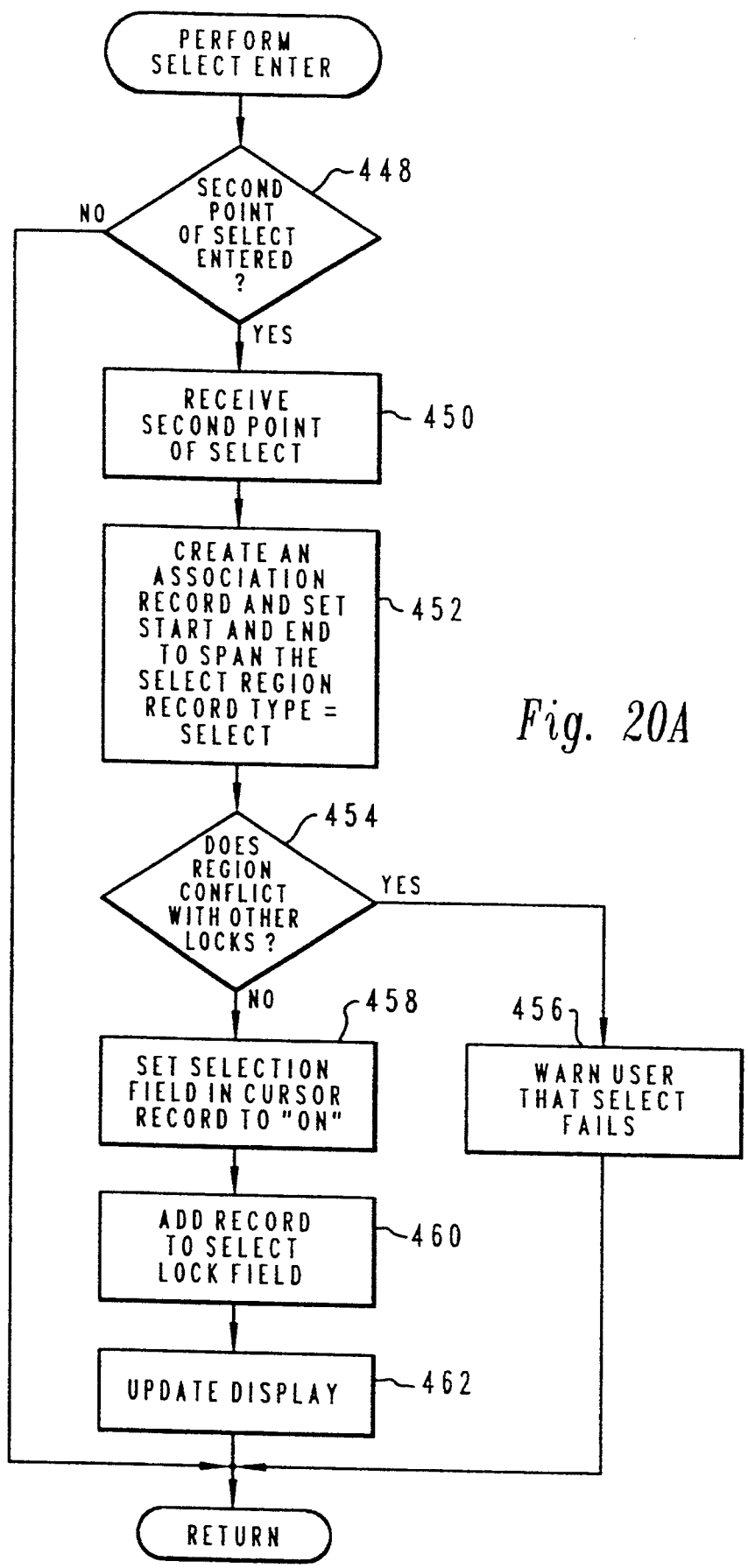
FIGS. 20A and 20B are flow charts relating to first and second embodiments of the invention, respectively, providing for user selection of regions within a shared data object.

Establishment of a user select region is a preliminary step to establishment by a user of an associational type or user select lock type region. Referring to FIG. 20A, a flow chart illustrates establishing a select region in a textual document. The perform select process is begun by selection of a select point in the editing process. Decision block 448 is utilized to determine if a second point of the select has been entered, which is required to continue the process. If a second select point is not received, the process is returned to the appropriate point in the editing process. A user may select as a second point the same point as was identified as the first select point, permitting creation of a select region of a single character.

From block 450, indicating receipt of a second select point, block 452 is utilized to create an association/lock record having as its start and end, the first and second select points in an appropriate order. The record type is set to "SELECT LOCK". Next, block 454 is utilized to determine if the new select region conflicts with any lock regions (again utilizing the process of FIG. 24A). If it does conflict, block 456 is utilized to warn the user that the select has failed and to delete the record. The process is then returned to the appropriate point in the editor. If no conflict was found at block 454, block 458 is utilized to set the selection field in the cursor record to "ON", block 460 is utilized to add the record to the select lock field and the display is updated (block 462) before return of the process to the appropriate point in the editor.

Figure 20B:
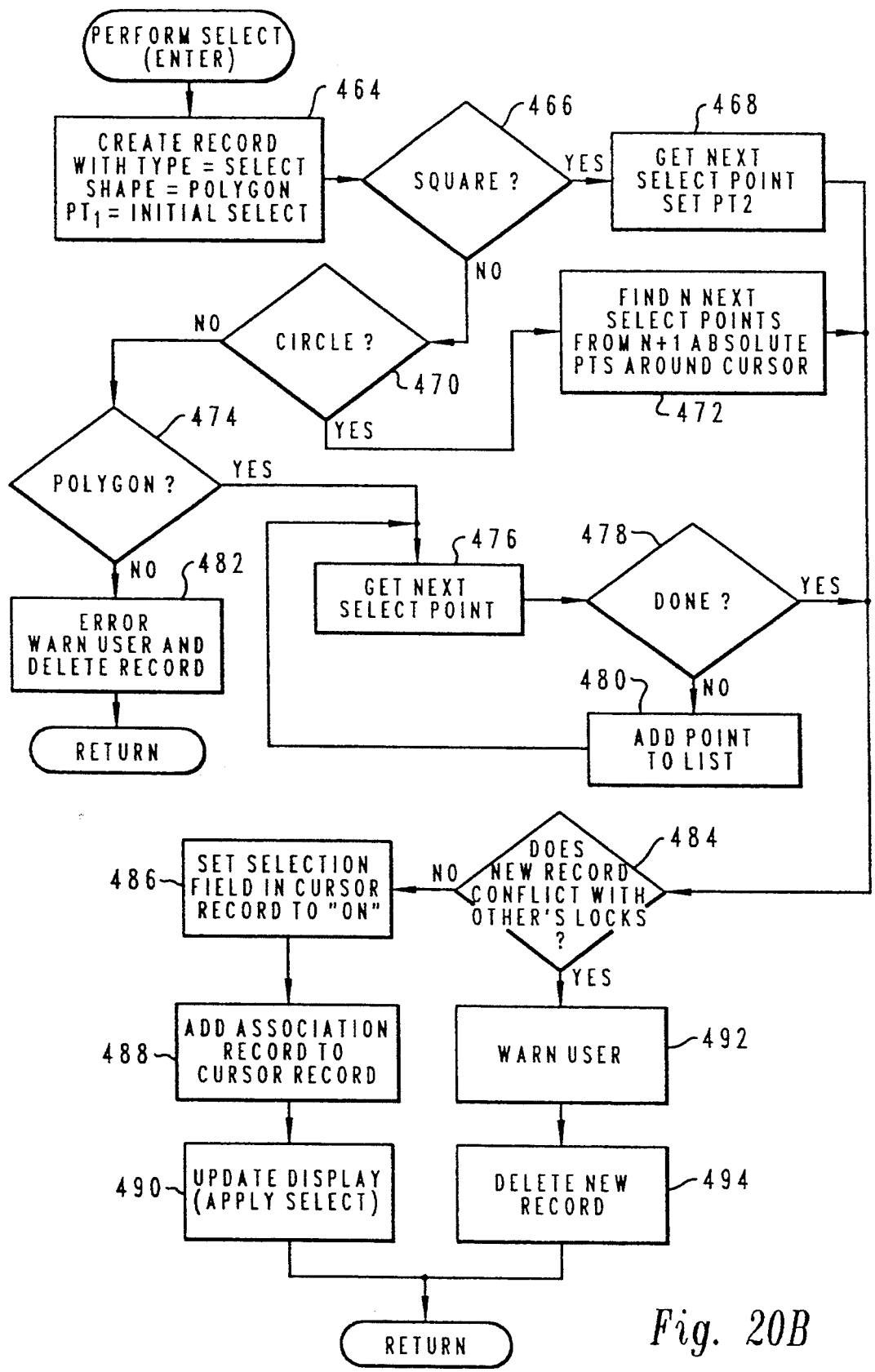

Referring to FIG. 20B, a flow chart illustrates establishing a select region in a graphics document. The perform select process is begun by selection of a select point during editing. The process is picked up in the flow chart with utilization of block 464 to create a association/lock record of the select type. It has a shape indicated to be a polygon and its first point is the initial select point. Next, decision block 466 is utilized to determine if the user has selected a square (or rectangular) shape for select region. If yes, block 468 is utilized to prompt the user to supply a second point to define the region. A user may select as a second point the same point as was identified as the first select point, permitting creation of a select region of a single pixel.

If a square shape is not selected, block 470 is utilized to determine if the user has selected a circular shape. If yes, block 472 is utilized to prompt the user to supply a radius, from which the next N select points can be generated to complete a substantially circular appearing polygon.

If a circular shape was not determined at block 470, decision block 474 is utilized to determine is a general polygon was selected by the user. If yes, the user is prompted to supply a series of points through block 476. The user may, instead of selection of an additional point signal the machine that all points have been supplied, which is detected utilizing decision block 478. After determining that the user is done, the polygon is closed and the process passes out of the loop along the YES branch from decision block 478. As long as the user does not signal completion, or until the user has selected the maximum number of permissible points, the process proceeds along the NO branch from block 478 to block 480, which adds the most recent selection to the list of points in the association/lock record, and then returns to block 476.

The NO branch from decision block 474 indicates that a user has failed to select a shape for the user select region, resulting in return of the process to the appropriate point in the editing process, after indicating error to the user and deletion of the record created at block 464 (block 482).

Upon completion of the boundary points of the user select region, decision block 484 is utilized to determine if the new record conflicts with another lock record (see FIG. 24B). If yes, block 492 is utilized to warn the user. Next, block 494 is utilized to delete the record created at block 464. The process is thereupon returned to the appropriate point in the editor.

If no conflict is detected at decision block 484, the process passes along the NO branch to operation block 486, which is utilized to the set selection field in the cursor record to "ON". Next, block 488 is utilized to fill in a pointer field in the association record list of the cursor record. Then, if operation is in the client, block 490 is utilized to update the display to indicate select of a region. The process is then returned to the appropriate point in the editor.

Figures 21, 22:
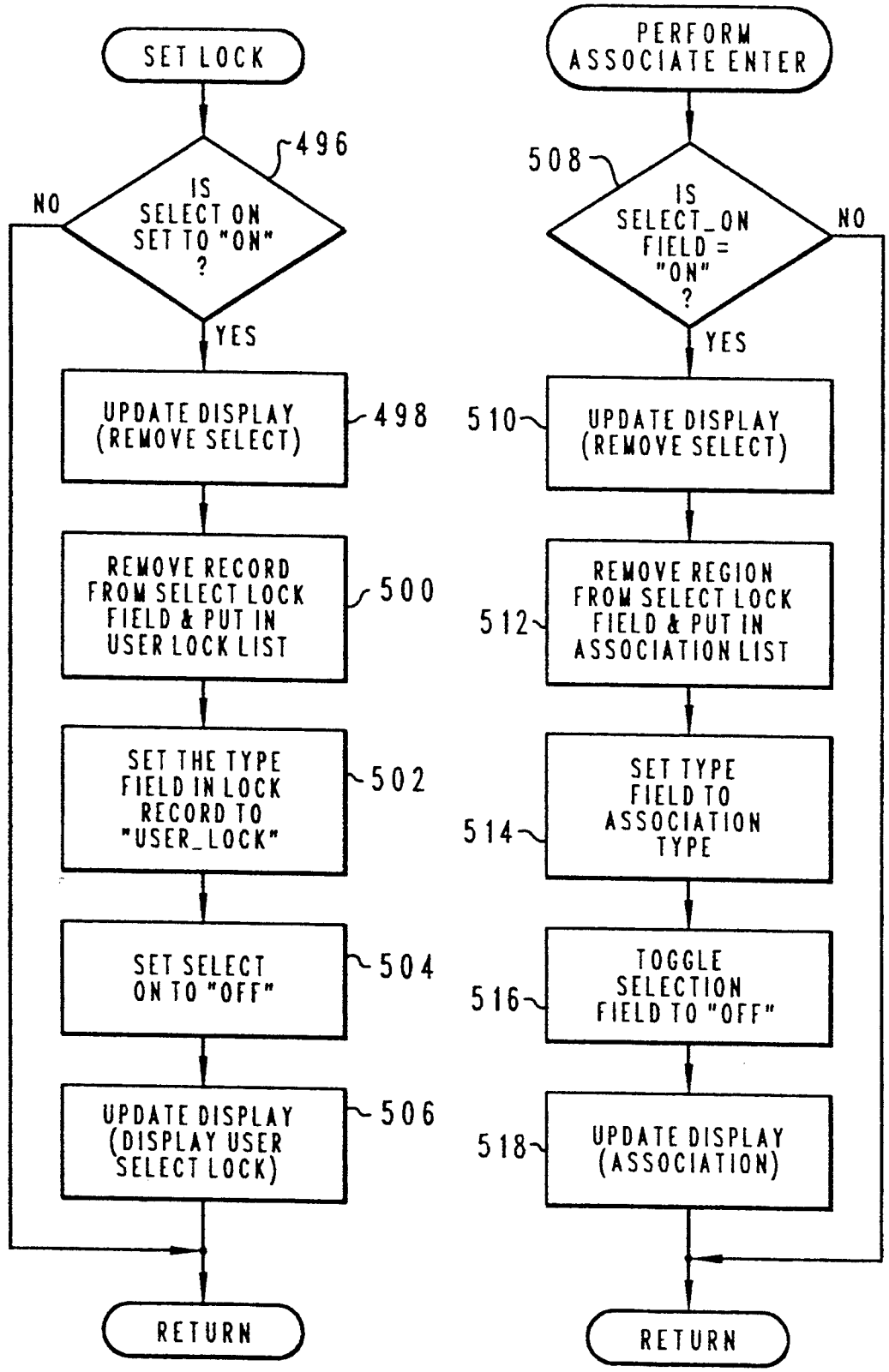
FIG. 21 is a flow chart relating user establishment of a lock region from a select region.
FIG. 22 is a flow chart relating to user designation of a select region as an associated region.

A set lock operation to convert a select region to a user select lock region is the same for both embodiments. Referring to FIG. 21, a flow chart relating user establishment of a lock region from a select region is depicted. Upon a request to set a lock, the process utilizes block 496 to determine if the select on field in the cursor record for the user is ON. If not the request is invalid and the process is returned to the appropriate point in the editor without substantial action. If the select on field is on, and if in the client, block 498 is utilized to update the display to remove the select indication from the region pointed to in the cursor record. Block 500 is utilized to remove the record from the select lock field and place it in the user lock list, if such a distinction is maintained in cursor records. Next, block 502 is utilized to reset the type field in the lock record to "user lock". Then, block 504 is utilized to reset the select on fields in the cursor record and the lock record to OFF. Lastly, before return to the editor, block 506 is executed to update the display to reflect the new lock region.

FIG. 22 depicts a flow chart relating to user designation of a select region as an associated region. Upon a request to perform an association operation, the process utilizes block See to determine if the select on field in the cursor record for the user is ON. If not, the request is invalid and the process is returned to the appropriate point in the editor without substantial action. If the select on field is on, and if the process is in the client, block 510 is utilized to update the display to remove the select indication from the region pointed to in the cursor record. Block 512 is utilized to remove the region from the select lock field and put it in the association list, if such a distinction is maintained in cursor records. Next, block 514 is utilized to reset the type field in the lock record to "user association". Then, block 516 is utilized to reset the select on fields in the cursor record and the association/lock record to OFF. Lastly, before return to the editor, block 518 is executed to update the display to reflect the new association region.

Figure 23:
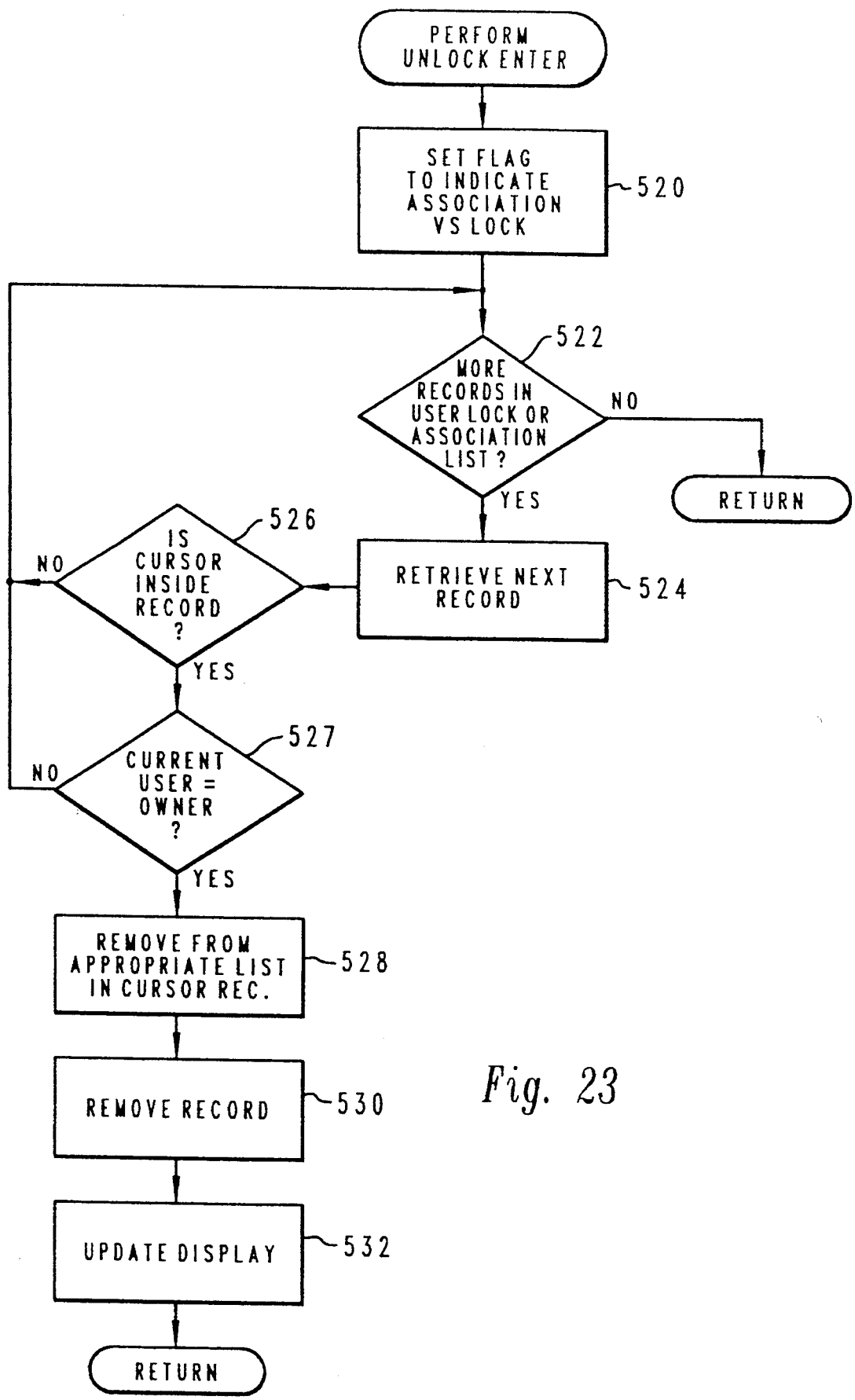
FIG. 23 is a flow chart relating to removal of a lock or association designation from a region.

User release of lock and association regions is next illustrated. Referring to FIG. 23, a flow chart relating to unlocking or disassociation of regions is illustrated. The process is initiated at block 520 with the setting of a flag to indicate if an unlock or a disassociation operation is being undertaken. The process will examine each record in the cursor lock and association lists until one is located in which the cursor is located. This process utilizes decision block 522, which determines if records exist in the user select lock list or association list for possible elimination. If such records exist they are recovered in the order of the list (block 524) and decision block 526 is utilized to determine if the cursor is within the bounds of the record. If not, the process returns to block 522. If a record is found in which the cursor lies, block 527 illustrates a determination of whether or not the current user is the owner of the record. If not, the process returns to block 522. If so, the pointer to the record is removed from the appropriate list in the cursor record. Next, at block 530, the record itself is released. Lastly, block 532 is utilized to update the display (again only in client terminals). The process is then returned to the appropriate point in the editor.

FIGS. 24A and 24B are flow charts relating to first and second embodiments of the invention providing for detection of lock conflicts, which are made upon user attempts to select a region or upon an attempt to move a cursor lock. Referring to FIG. 24A, there is illustrated such a comparison for a text editing environment. The process begins with an inquiry relating to the presence of user select lock or cursor lock records. If none exist or remain, the inquiry is complete and the NO branch from block 534 is taken back to the requesting routine, indicating to the requesting routine that no conflict exists. If records remain, the next such record is retrieved utilizing block 536. Decision block 538 is utilized to determine if the current cursor is the owner of the record. If yes, the record can be disregarded and the process returns to block 534 on the YES branch from block 538. Along the NO branch, decision block 540 is utilized to determine if a the record is a lock of either type. If not, the record may be disregarded and the process returns to block 534. If yes, determination is made if the requested select or lock region has common points with the lock record. Decision block 542 is utilized to determine if the lock (select) region input start occurs with or after the recovered lock record start. If yes, block 546 is utilized to determine if the input record start occurs before or with the end of the recovered lock record end. If it does, a conflict is present and such indication is returned to the requesting process. If it does not so occur, the process returns to block 534 and examination of the next record. Along the NO branch from decision block 542, the process utilizes decision block 544 to determine if the input record end occurs after or with the lock record start. If not, no conflict exists and the process returns to block 534. If yes, a conflict exists and operation is returned to the requesting process with an indication of the conflict.

Referring to FIG. 24B, there is illustrated such a comparison for a graphics editing environment. The process begins with an inquiry relating to the presence of user select lock or cursor lock records. If no records exist or remain, the inquiry is complete and the NO branch from block 548 is taken back to the requesting routine, indicating to the requesting routine that no conflict exists. If records remain, the next such record is retrieved utilizing block 550. Next, decision block 552 is utilized to determine if the current cursor is the owner of the record. If yes, the record can be disregarded and the process returns to block 548 on the YES branch from block 552. Along the NO branch, decision block 554 is utilized to determine if a the record is a lock of either type. If not, the record may be disregarded and the process returns to block 548. If yes, the record and the input region must be compared for possible overlap. Decision block 556 is used to determine such overlap. The test is one to determine if the polygon of the input region overlap the polygon that is returned from the lock record recovered at block 550. If they do, a conflict indication is returned to the requesting process. If no overlap is found, the process returns to block 548 for examination of further records.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. In a multi-media collaborative computer based system including a network connecting a plurality of terminals of communication, an output display device for each terminal, a user input device for each terminal, and a shared data object concurrently accessible by a plurality of users of the system, a method of protecting transitory, floating blocks of the shared data object from concurrent manipulation originating with more than one user, the method comprising the steps performed by a computer of:

responsive to a user obtaining access to the shared data object, assigning the user a cursor available for display on the output display devices;

releasing a previously established cursor associated lock region upon movement of the cursor outside of the previously established cursor associated lock;

responsive to the movement of the cursor, determining a position for a cursor associated lock region related to the position of the cursor in the shared data object; and if the position for the cursor associated lock region does not include a portion of an established lock region, establishing the cursor associated lock region for the cursor.

2. A method of protecting transitory, floating blocks of the shared data object from concurrent manipulation originating with more than one user as set forth in claim 1, wherein the permitting step includes:

determining if any user selected conditions for establishment of a cursor lock region exist;

if such conditions exist determining if they are met; and if the conditions are met establishing the cursor associated lock region.

3. A method of protecting transitory, floating blocks of the shared data object from concurrent manipulation originating with more than one user as set forth in claim 2, wherein the media of display include graphics and picture, the method further comprising the step of:

responsive to use selection, establishing an object mode for a cursor associated lock region wherein a condition for establishing the cursor associated lock region is the presence of an object under the cursor.

4. A method of protecting transitory, floating blocks of the shared data object from concurrent manipulation originating with more than one user as set forth in claim 1, the method further comprising the steps of:

determining whether a current user initiated action dictates modification of the shared data object;

if the current user initiated action is a modification, determining if the modification would occur within a lock region; and if the modification would occur within a lock region and if attempted through a cursor other than the one associated with the lock region, preventing the modification.

5. A method of protecting transitory, floating blocks of the shared data object from concurrent manipulation originating with more than one user as set forth in claim 1, wherein the shared data object text.

6. A method of protecting transitory, floating blocks of the shared data object from concurrent manipulation originating with more than one user as set forth in claim 1, wherein a plurality of modes controlling shape and size of a cursor associated lock region are permitted each user.

7. A method of protecting transitory, floating blocks of the shared data object from simultaneous manipulation originating with more than one user as set forth in claim 1, wherein an assigned cursor includes a visual attribute to distinguish it as to its owner.

8. A collaborative multi-media computer based system for protecting transitory, floating blocks of a shared data object from concurrent manipulation originating with two or more users, the collaborative computer based system comprising:

a plurality of terminals, each terminal having an output display device and a user input device;

a computer;

a network connecting the terminals and the computer for communication;

the shared data object being simultaneously accessible through a plurality of private views by a plurality of users;

means, responsive to a user obtaining access to the shared data object, for assigning the user a cursor available for display on the output display devices;

means, responsive to user selection, for moving a cursor assigned the user within the shared data object;

means, responsive to movement of a cursor, for determining a position for a lock region associated with the cursor in the shared data object;

means, responsive to movement of the cursor outside of a previously established lock region, for releasing the previously established lock region; and means, responsive to the position not including any portion of any previously established lock region, for establishing the new lock region.

9. A collaborative computer based system for protecting transitory, floating blocks of a shared data object as set forth in claim 8, wherein means for establishing the new lock region further includes:

means for establishing a cursor lock mode specifying coverage of any cursor associated lock region; and means, responsive to user selection of a particular lock mode for specifying conditions under which a cursor associated lock is to be generated.

10. A collaborative computer based system for protecting transitory, floating blocks of a shared data object as set forth in claim 9, wherein one cursor lock mode is an object mode, wherein a cursor associated lock region extends to a defined subobject within the shared data object upon the condition that the cursor lies over the subobject.

11. A collaborative computer based system for protecting transitory, floating blocks of a shared data object as set forth in claim 9, wherein the collaborative computer based system further comprises:

means for serializing user commands.

12. A collaborative computer based system for protecting transitory, floating blocks of a shared data object as set forth in claim 11, the collaborative computer based system further comprising:
    means for checking whether a command from the current user indicates modification of the shared data object;
    means, responsive to such a command, for determining if the indicated modification occurs within a lock region associated with a cursor other than the cursor assigned the current user;
    means, responsive to positive determination, for blocking the modification; and
    means, responsive to a negative determination, for entering the modification.

13. A collaborative computer based system for protecting transitory, floating blocks of a shared data object as set forth in claim 8, wherein the shared data object is manipulated by a text editor.

14. A collaborative computer based system for protecting transitory, floating blocks of a shared data object as set forth in claim 8, wherein
    an assigned cursor includes a visual attribute to distinguish it as to its owner.

* * * * *